July 18, 1933.   A. D. WILT, JR   1,918,626
MACHINE FOR MANUFACTURING TAPS AND OTHER ARTICLES
Filed Nov. 21, 1930   27 Sheets-Sheet 6
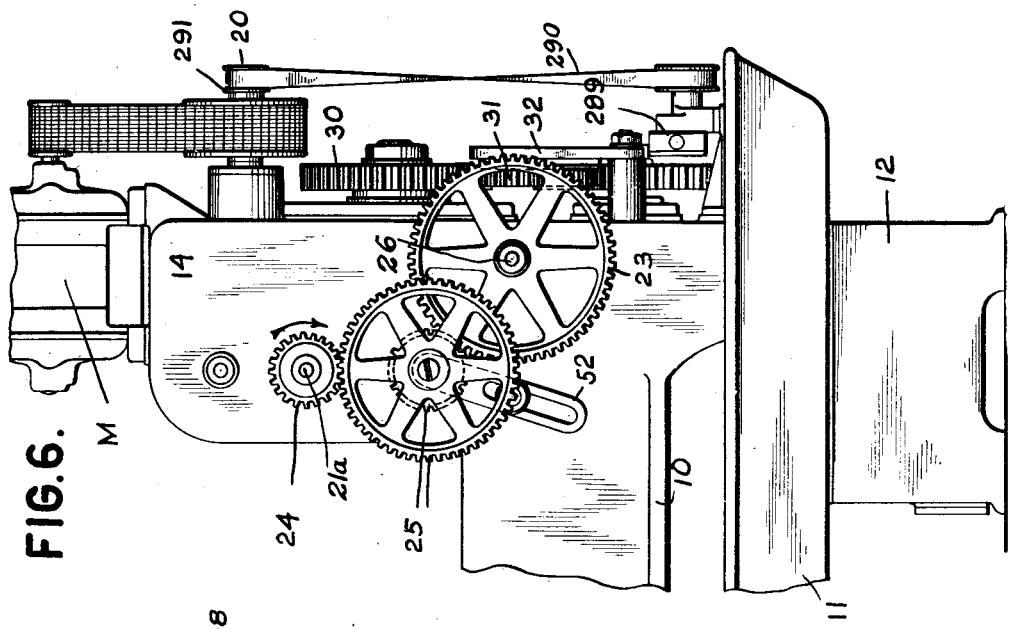
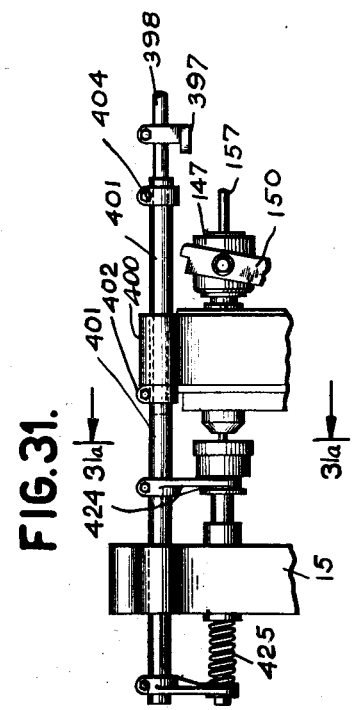
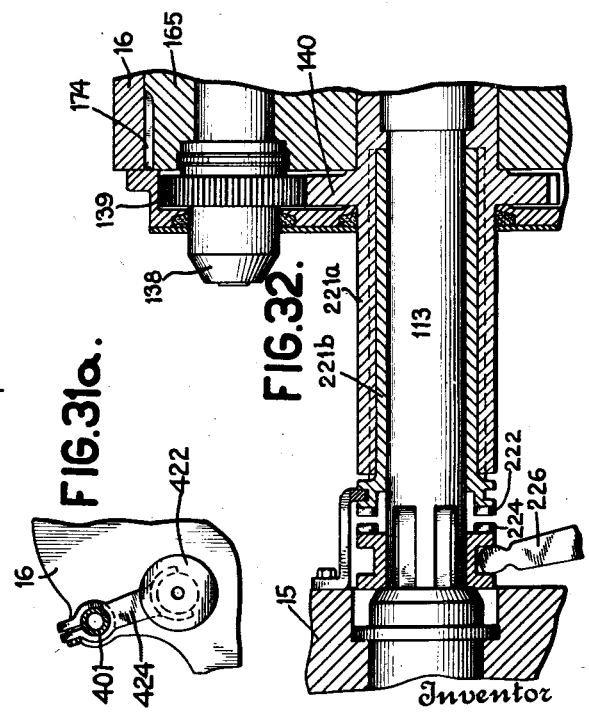
Inventor
Abram D. Wilt, Jr.
By His Attorneys
Bohleber + Ledbetter July 18, 1933.  A. D. WILT, JR  1,918,626
MACHINE FOR MANUFACTURING TAPS AND OTHER ARTICLES
Filed Nov. 21, 1930   27 Sheets-Sheet 7
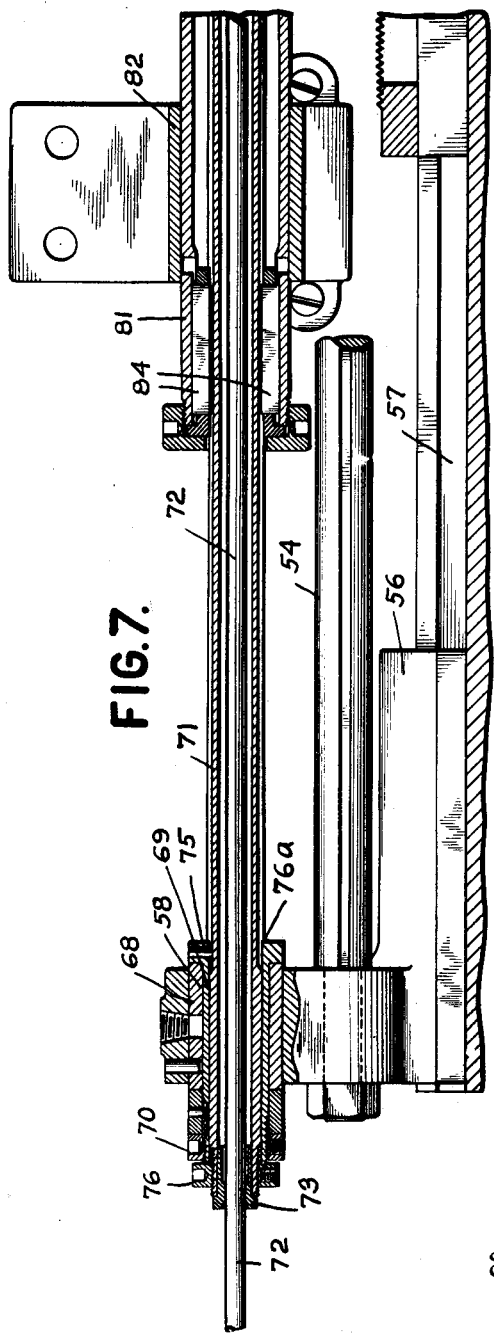
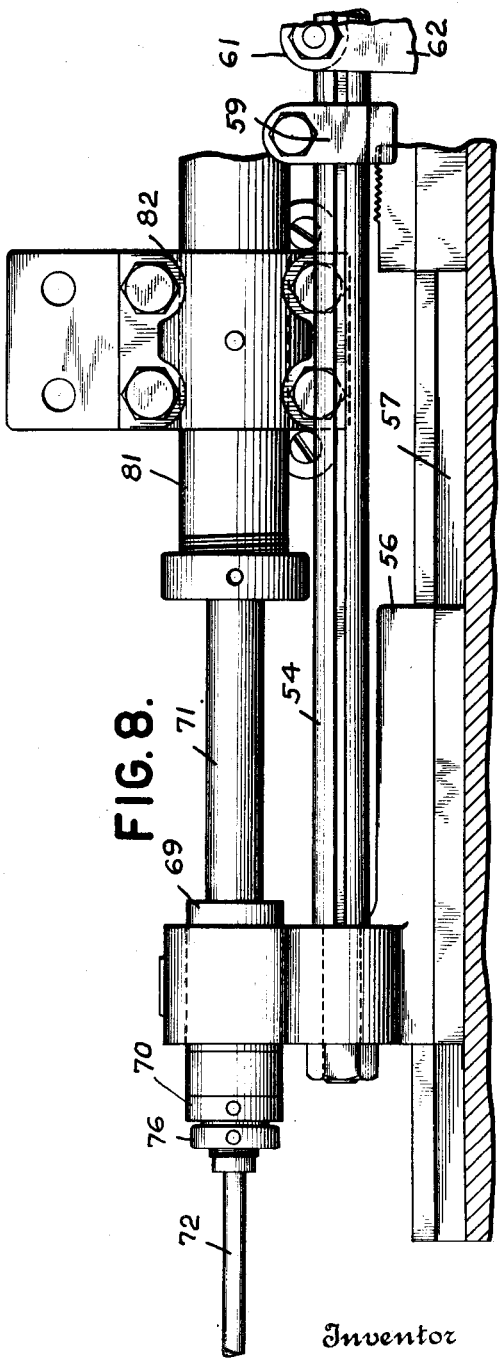
Inventor
Abram D. Wilt, Jr.
By His Attorneys
Bohleber + Ledbetter

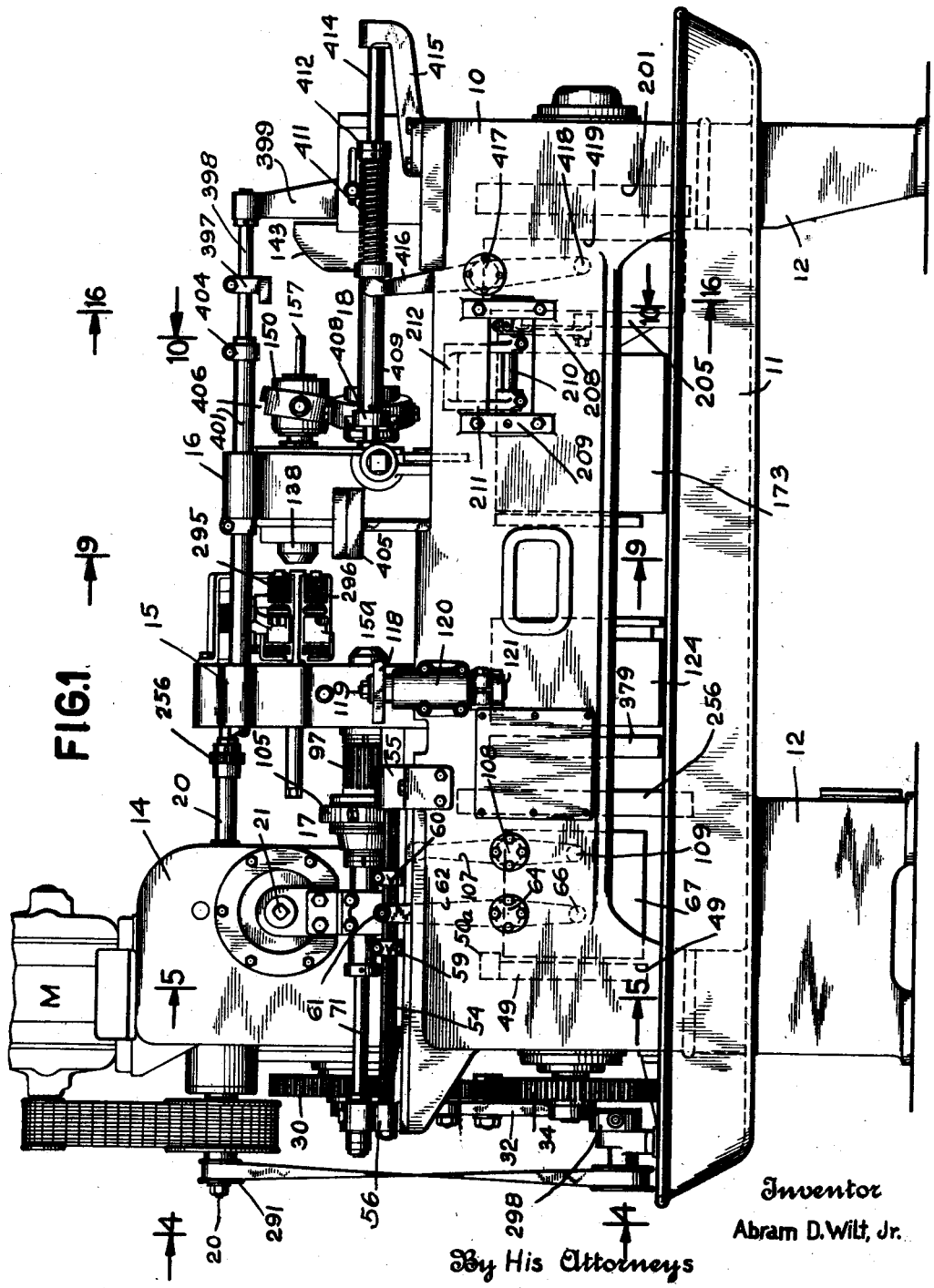

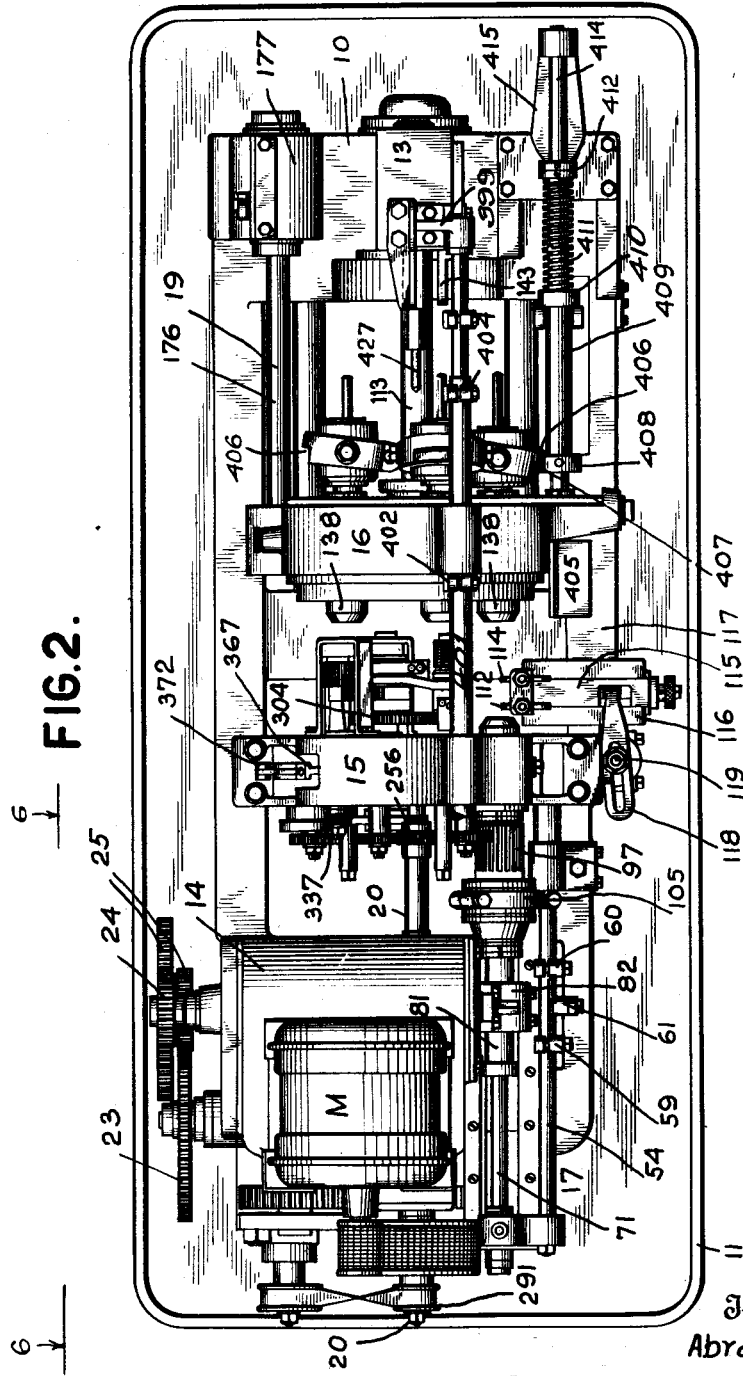

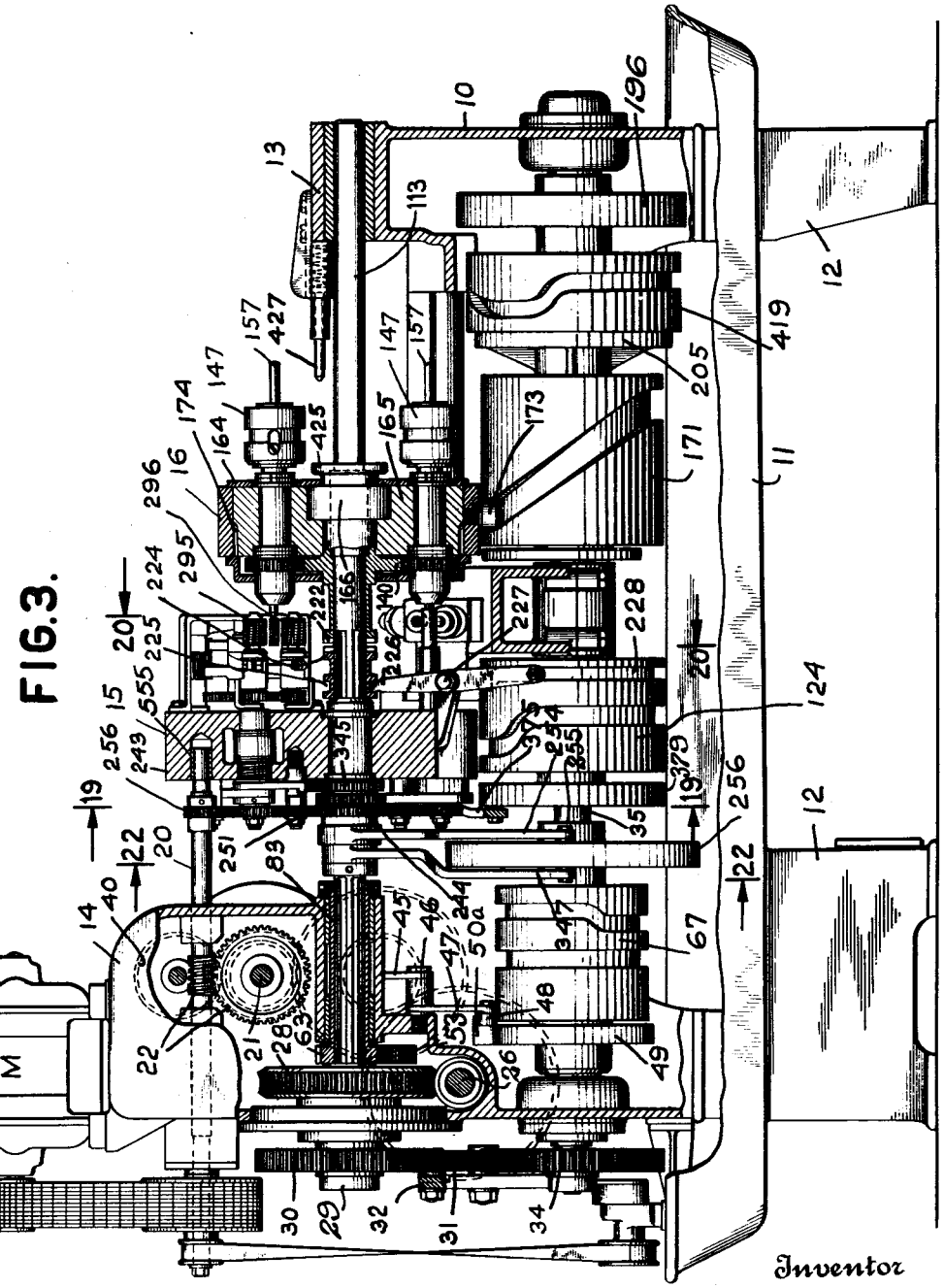

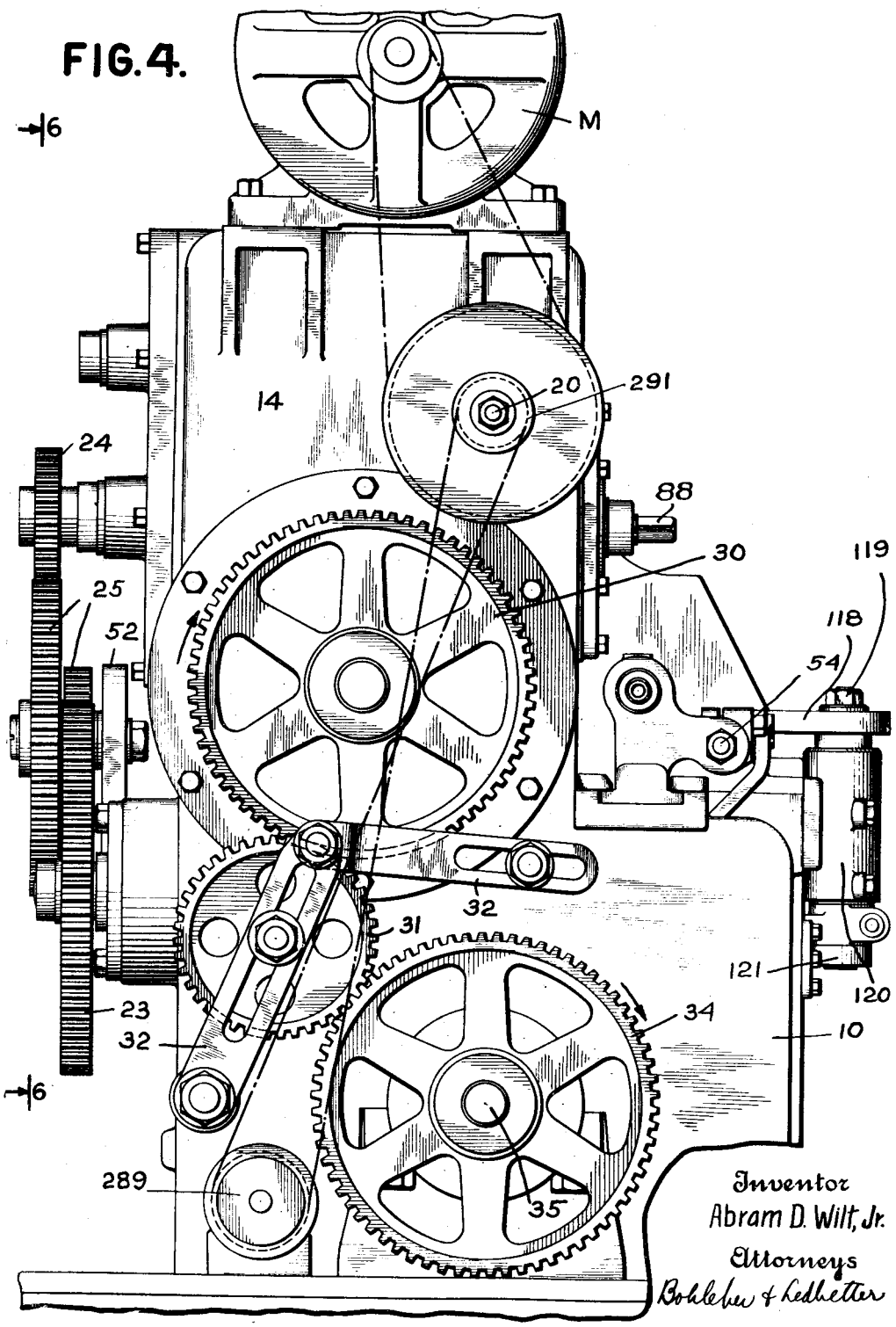

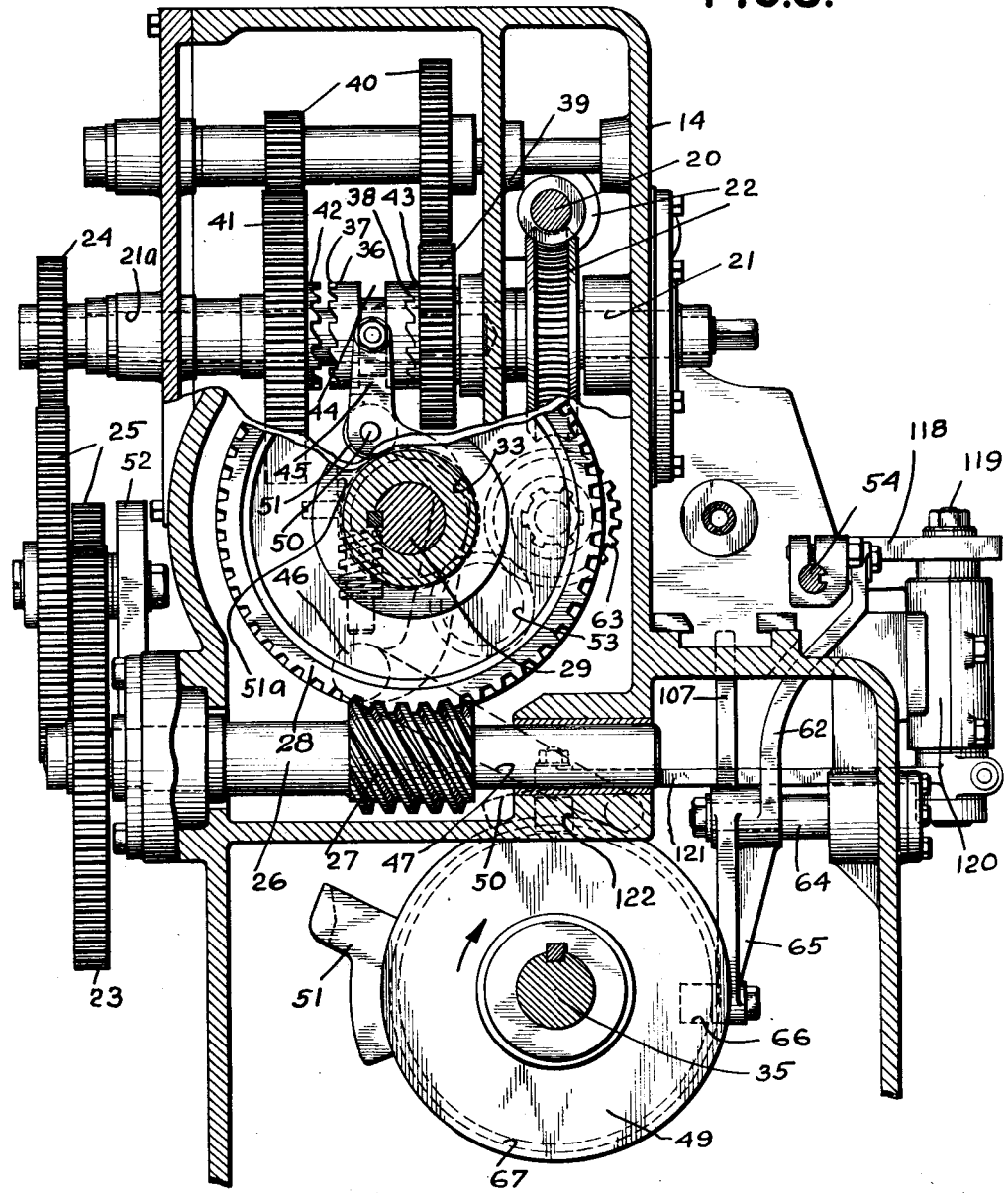

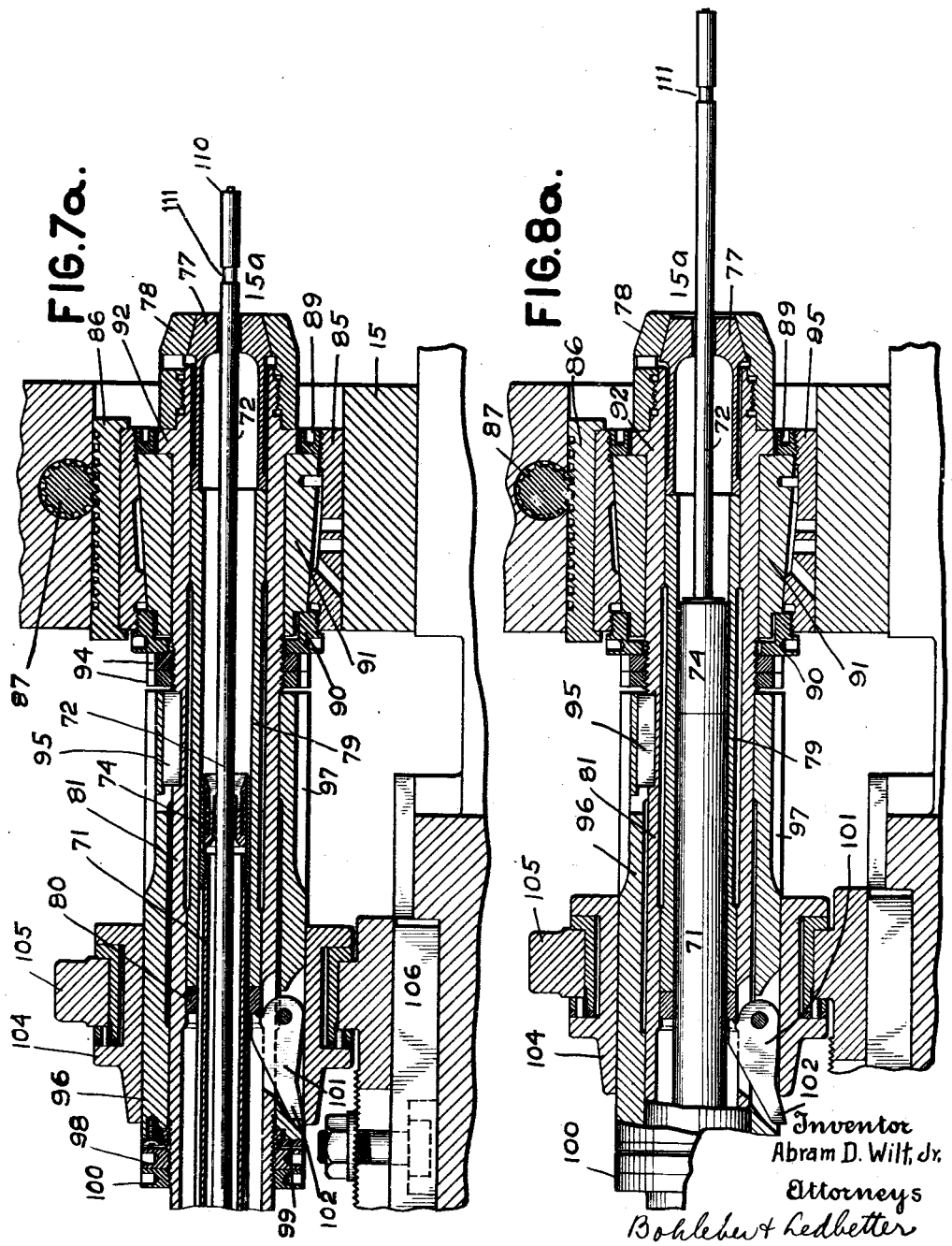

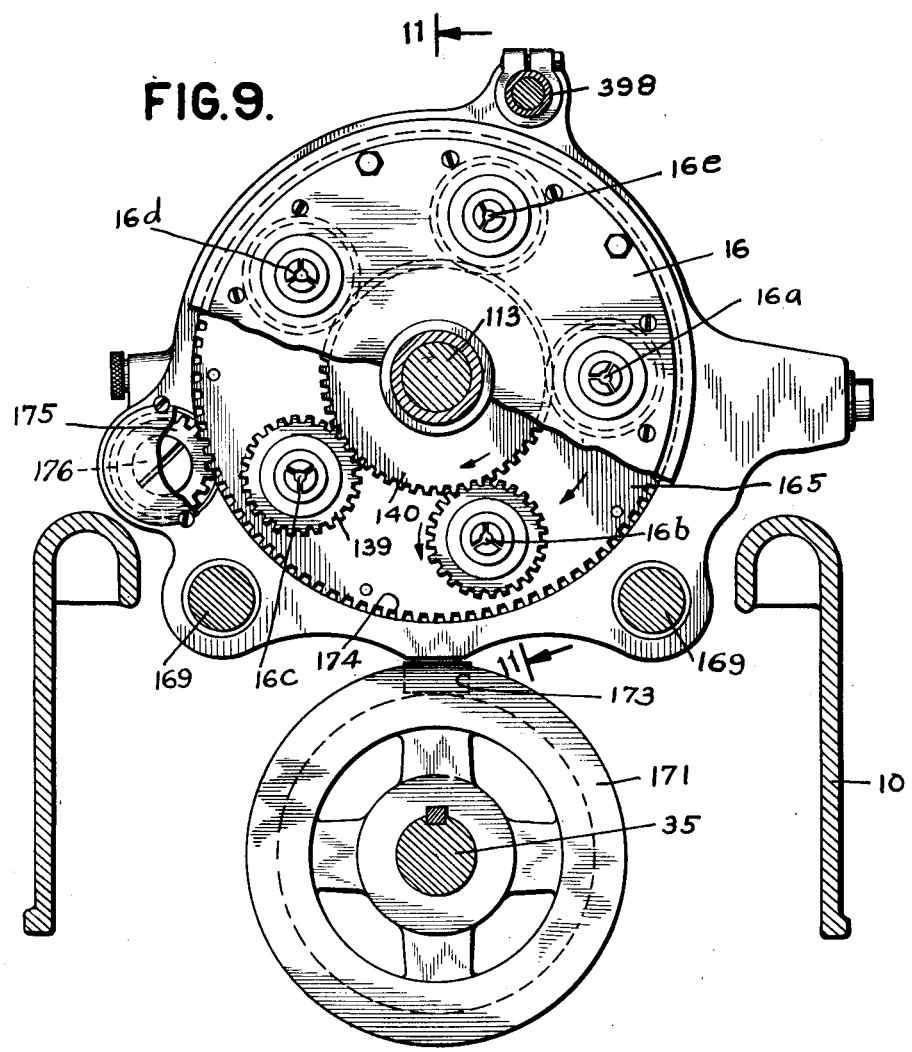

July 18, 1933.    A. D. WILT, JR    1,918,626
MACHINE FOR MANUFACTURING TAPS AND OTHER ARTICLES
Filed Nov. 21, 1930    27 Sheets-Sheet 10

Inventor
Abram D. Wilt, Jr.
By His Attorneys
Bohleber + Ledbetter

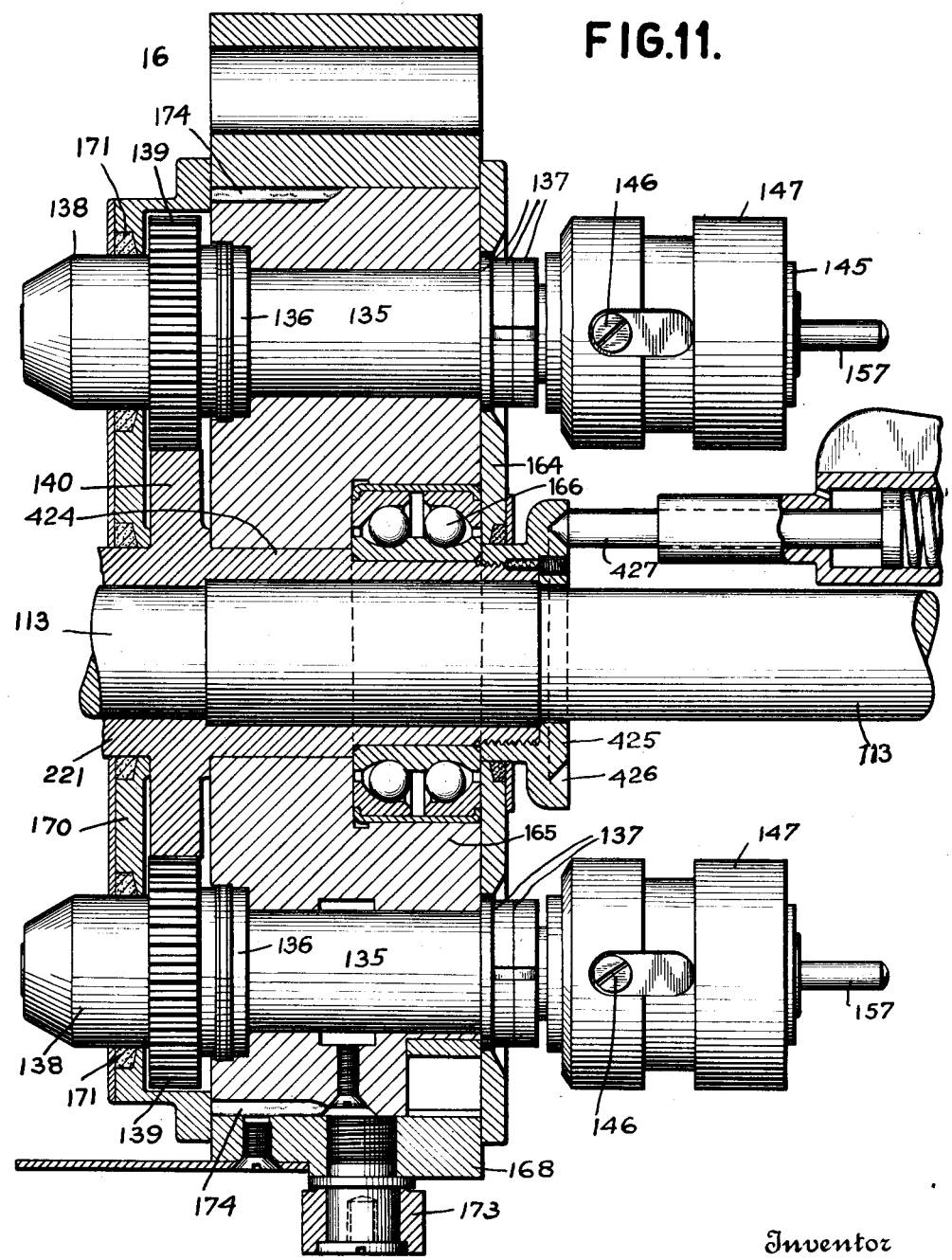

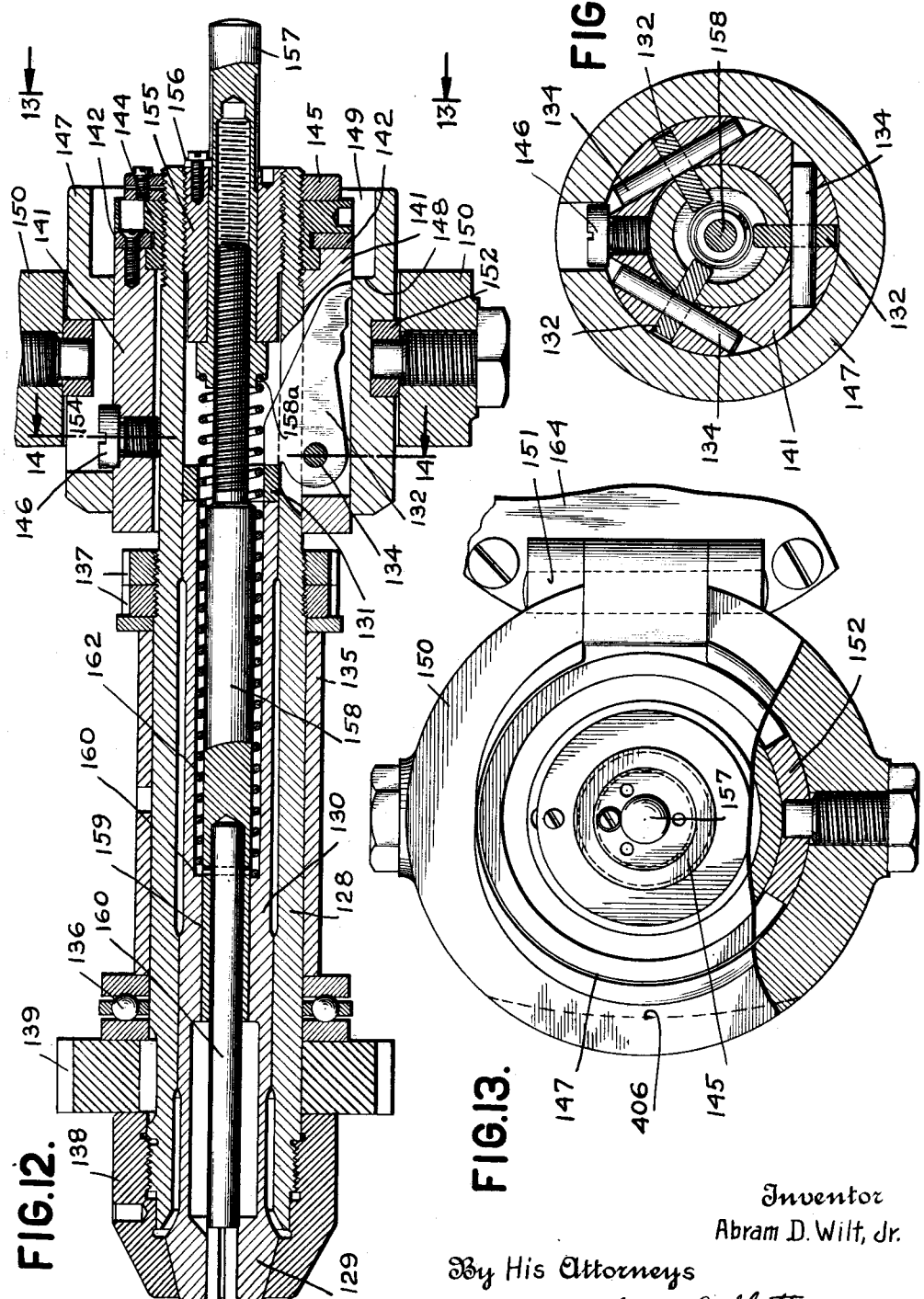

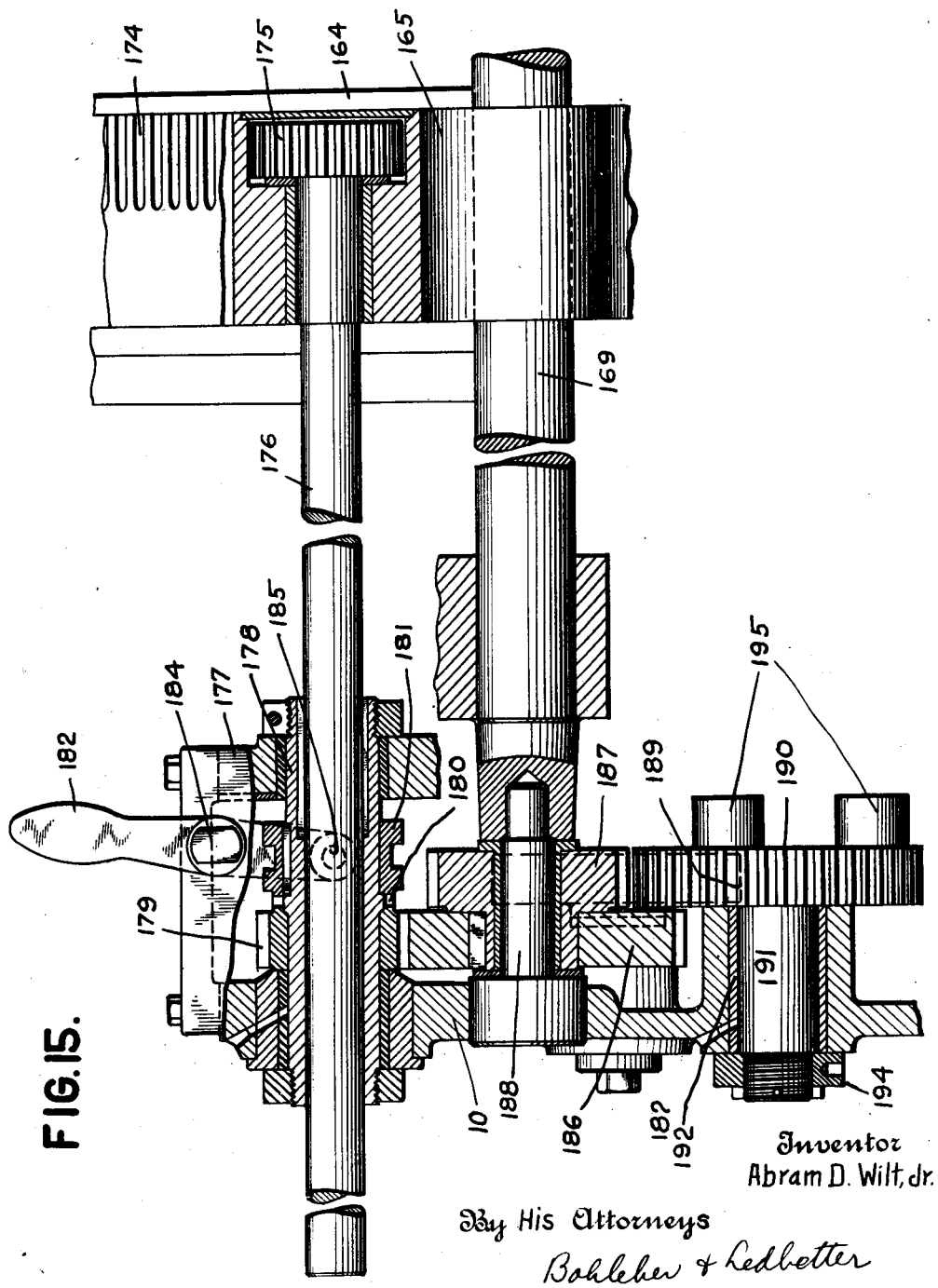

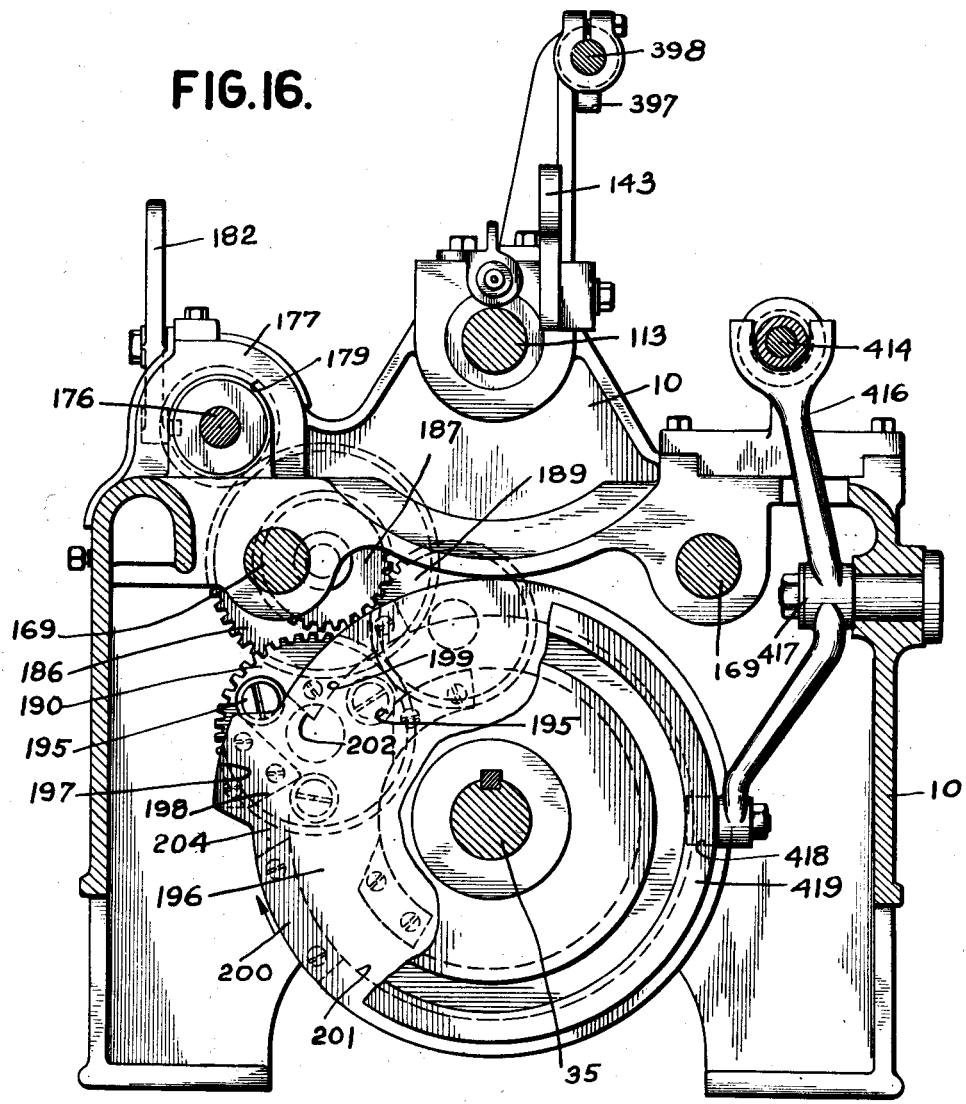

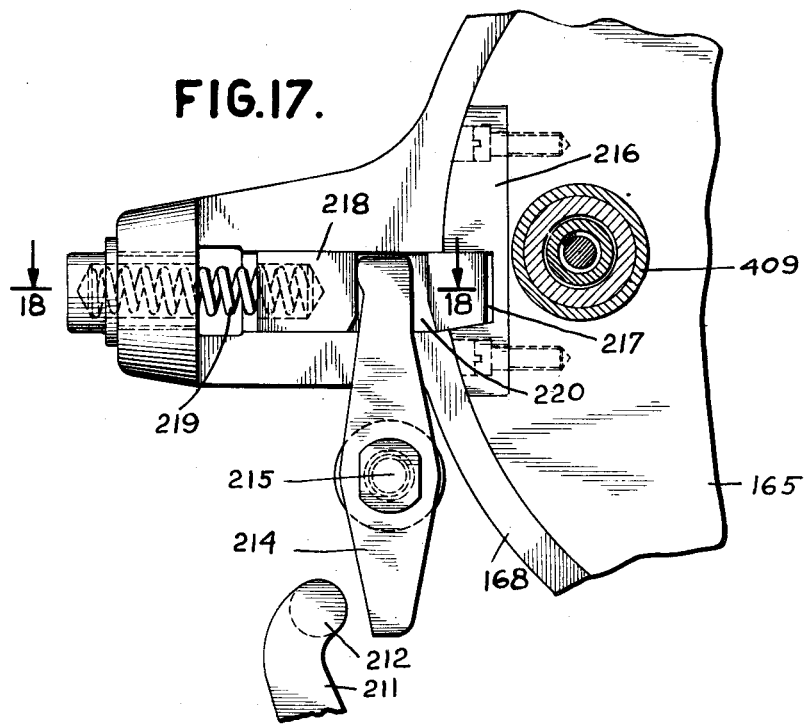
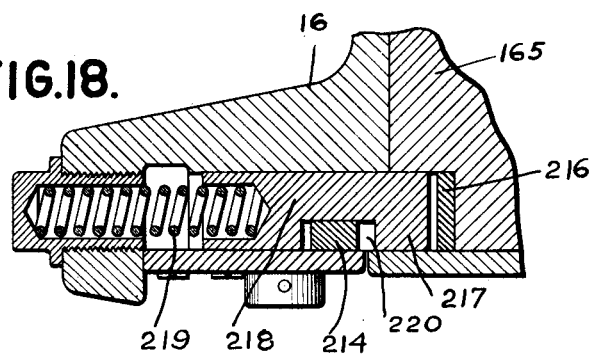

Inventor
Abram D. Wilt, Jr.
By His Attorneys
Bohleber + Ledbetter

Inventor
Abram D. Wilt, Jr.

By His Attorneys
Bohleber + Ledbetter

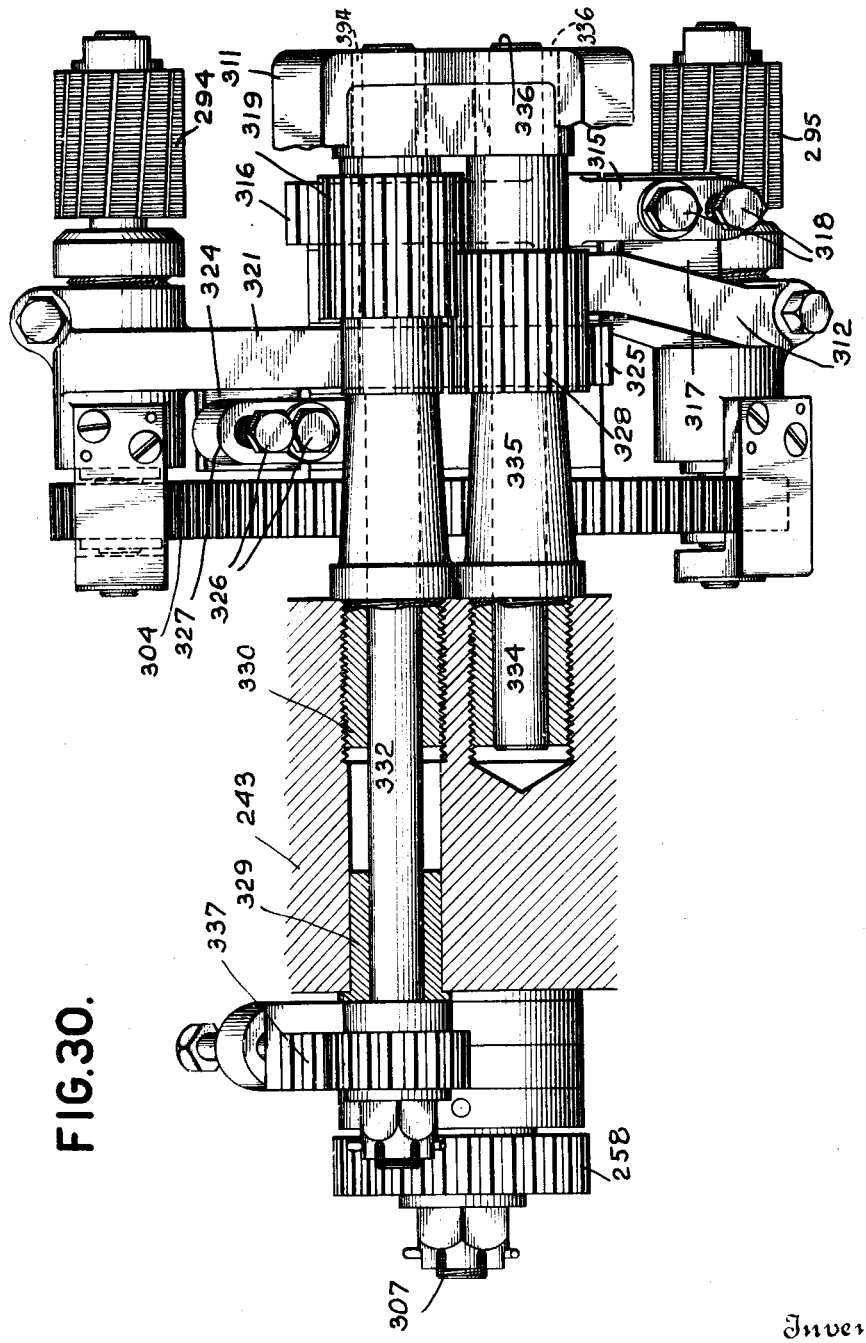

July 18, 1933.   A. D. WILT, JR   1,918,626
MACHINE FOR MANUFACTURING TAPS AND OTHER ARTICLES
Filed Nov. 21, 1930   27 Sheets-Sheet 24
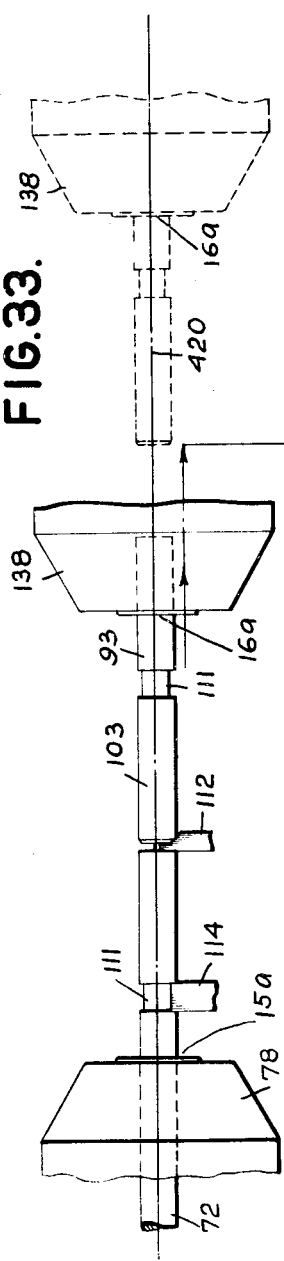
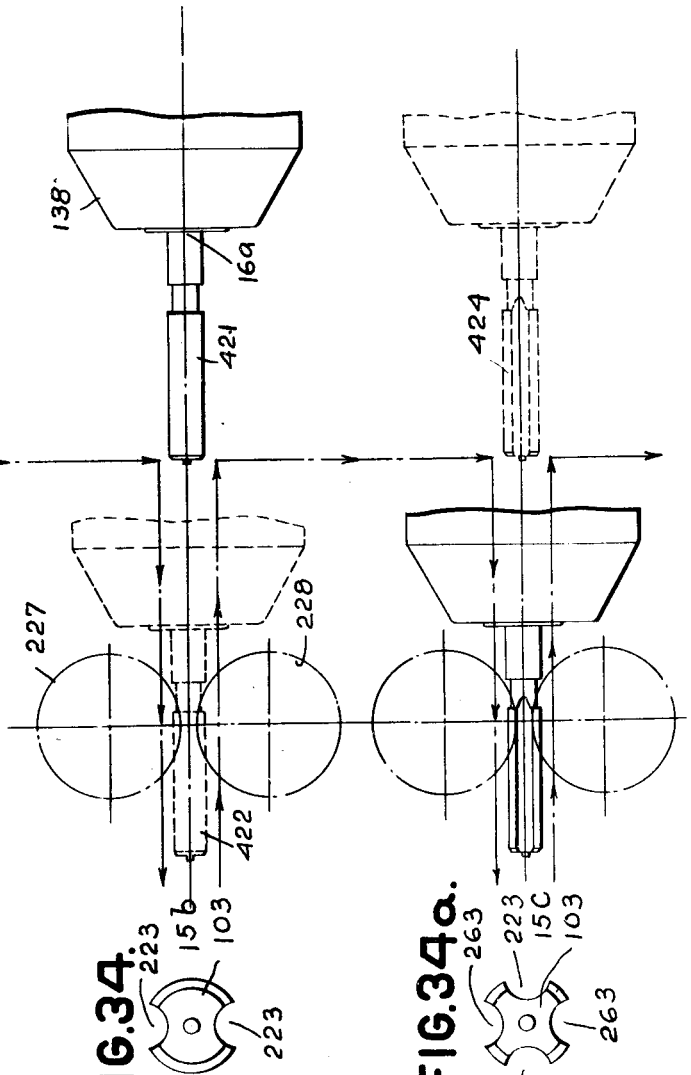
Inventor
Abram D. Wilt, Jr.
By His Attorneys
Bohleber + Ledbetter July 18, 1933. A. D. WILT, JR 1,918,626
MACHINE FOR MANUFACTURING TAPS AND OTHER ARTICLES
Filed Nov. 21, 1930 27 Sheets-Sheet 25
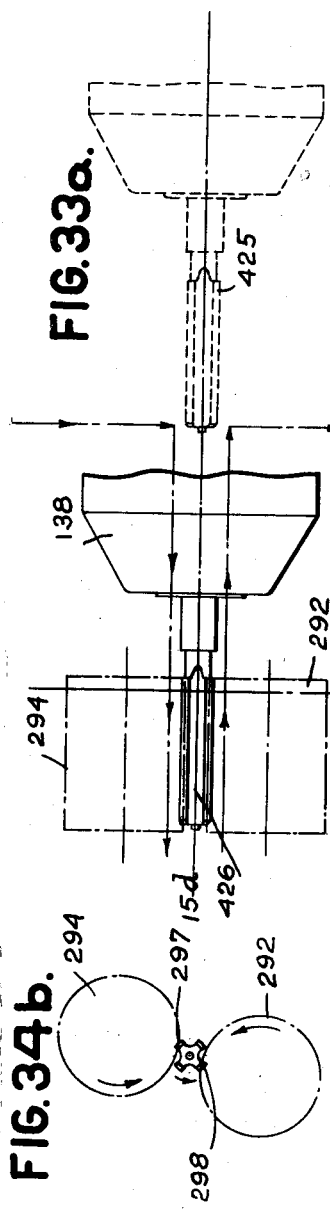
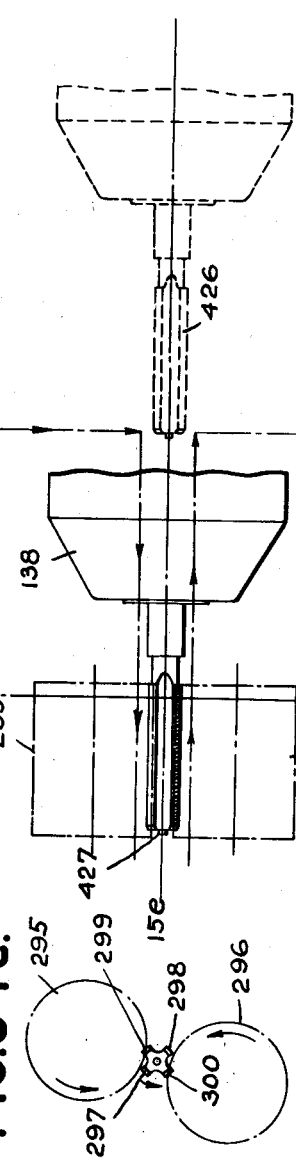
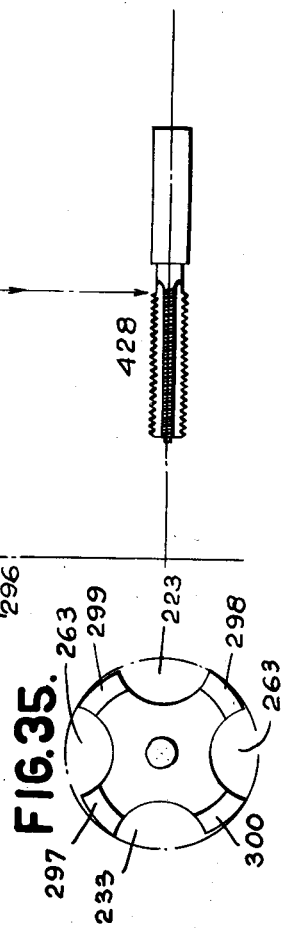
Inventor
Abram D. Wilt, Jr.
By His Attorneys
Bohleber + Ledbetter July 18, 1933.   A. D. WILT, JR   1,918,626
MACHINE FOR MANUFACTURING TAPS AND OTHER ARTICLES
Filed Nov. 21, 1930   27 Sheets-Sheet 26

Inventor
Abram D. Wilt, Jr.
By His Attorneys
Bohleber & Ledbetter

July 18, 1933. A. D. WILT, JR 1,918,626
MACHINE FOR MANUFACTURING TAPS AND OTHER ARTICLES
Filed Nov. 21, 1930 27 Sheets-Sheet 27
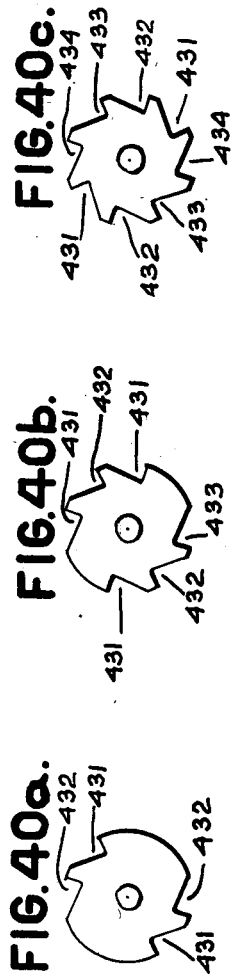
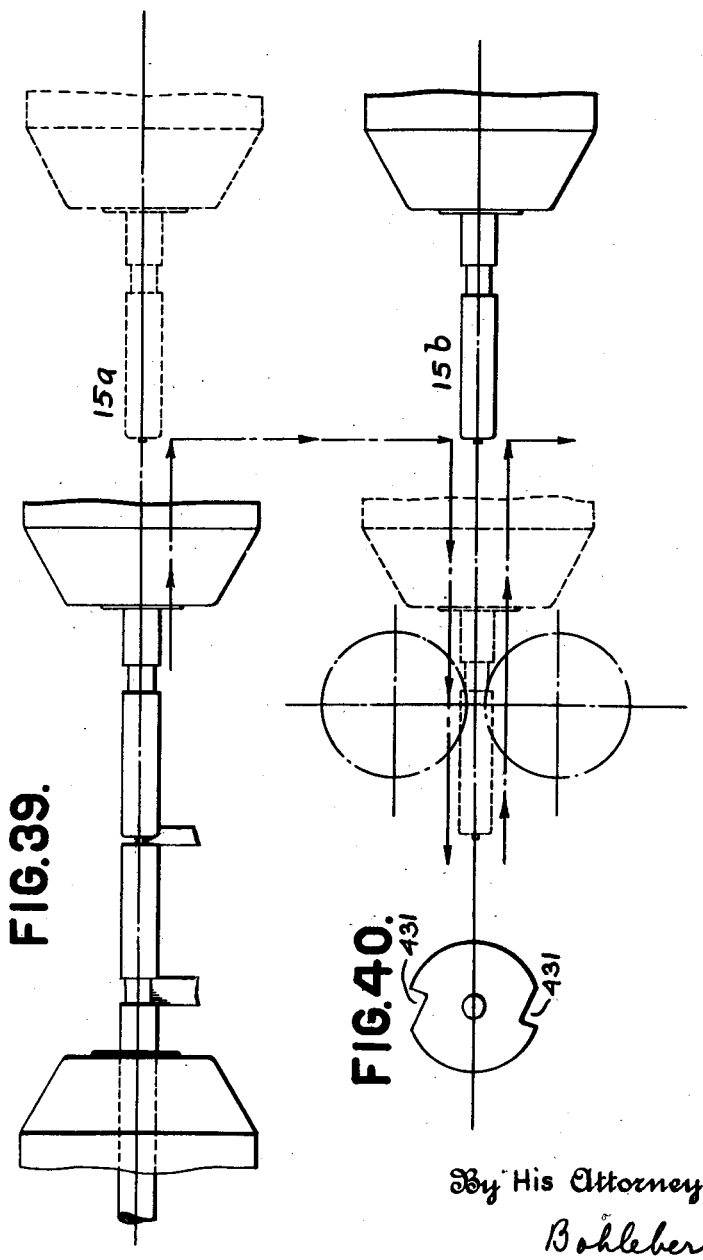
Inventor
Abram D. Wilt, Jr.
By His Attorneys
Bohleber & Ledbetter Patented July 18, 1933

1,918,626

UNITED STATES PATENT OFFICE

ABRAM D. WILT, JR., OF NEW CANAAN, CONNECTICUT

MACHINE FOR MANUFACTURING TAPS AND OTHER ARTICLES

Application filed November 21, 1930. Serial No. 497,154.

This invention consists of an automatic machine which is designed primarily for the manufacture of taps and blanks from a bar of raw stock, but is also capable of making twist drills, reamers, screws and many other like articles. Herein the automatic machine described is mainly for the specific purpose of making taps.

In the automatic machine described in the following specification the several operations of cutting the stock and machining and finishing the taps are performed successively, at a plurality of work stations, the various operations being performed simultaneously.

There is provided a tool holder or head which carries a plurality of grooving cutters for fluting the blank and a plurality of thread milling cutters for producing the thread on the tap being made. This tool holder or head cooperates with a turret or blank carrier for holding the several blanks or pieces of stock. This turret is provided with chucks or devices for holding the blanks in position to be operated on at various stations.

The blanks, after being circumferentially grooved and severed from the bar stock are received and held by the chucks and by the rotation of the turret, controlled by the index mechanism, and are carried from station to station where the various work operations are performed.

In this way, as all the chucks of the turret are provided with blanks, a different operation of the work is being carried on at each tool station, and then by the rotation of the turret the blanks are moved to the next work station for the next succeeding operation or are expelled from the machine as the case may be.

The automatic machine shown in the drawings and described in the following specification differs from others in the prior art by the fact that there is a correlation between the work performed at one station and that performed at the next succeeding station.

In the drawings a machine is shown for manufacturing taps having four flutes or grooves and, therefore, four sets of cutting edges. In manufacturing such an article the operations involve at the first work station the dressing or shaping of the blank and the cutting of the same from the bar of stock. At the second station, the grooves are milled on opposite sides of the blank. At the third station the other two grooves are milled on opposite sides. At the fourth station the threads are milled for two of the cutting edges. At the fifth station the other two sets of threads are milled.

In other words this machine is so organized as to have the work divided into nearly even stages and is, therefore, capable of turning out a great many taps in a short period of time. If the milling or flute cutters at one station are designed to cut the grooves on opposite sides in a predetermined time, it follows that the operation of cutting similar grooves in between the first grooves cut must occur during a corresponding period of time.

Also the time of the operation of milling the threads on the first two cutting edges must bear a relation to the length of time of the grooving operation.

In other words, accomplishing that portion of the work related to any one tool station requires substantially the same length of time for its operation as for any other station.

The general object of the machine, therefore, is to cut blanks from a continuous bar of stock and perform the various cuts and operations thereon at successive tool stations, and finally to eject from the machine the finished product.

The subject matter of this invention consists in the improvement of machines of this type, the nature and purpose of which will be described in detail by reference to the accompanying drawings.

The objects of my invention may be accomplished by the use of the apparatus illustrated in these drawings which are the best embodiment of my invention of which I am now aware.

Description of figures

Figure 1 is a side elevation of the complete machine.

Figure 2 is a top plan view of the same.

Figure 3 is a central longitudinal section of the complete machine with certain parts left in elevation.

Figure 4 is an end view of the machine looking in the direction of the arrows 4—4 of Fig. 1.

Figure 5 is a transverse section taken on the line 5—5 of Fig. 1.

Figure 6 is an elevation of a portion of the drive mechanism looking from the left in Fig. 2.

Figures 7 and 7a are views forming a central longitudinal section of the devices for gripping and feeding the stock.

Figures 8 and 8a are views of the parts shown in Figs. 7 and 7a, Fig. 8 being in elevation and Fig. 8a a central longitudinal section with the parts in different position than shown in Fig. 7a.

Figure 9 is a transverse section of certain parts, particularly the work carrier, taken on the line 9—9 of Fig. 1 looking from the left.

Figure 11 is a sectional elevation of parts of the work carrier shown in Fig. 9 and taken on the line 11—11 of Fig. 9.

Figure 12 is a section of one of the work chucking or gripping mechanisms, which is shown in outside view in Fig. 11 and which carry the blanks to be operated on.

Figure 13 is a view taken in the direction of the arrows 13—13 of Fig. 12 and shows the chuck operating collar.

Figure 14 is a transverse section on the line 14—14 of Fig. 13.

Figure 15 is a central longitudinal section of the mechanism which rotates the turret and indexes the chuck carrying head.

Figure 16 is a transverse section on the line 16—16 of Fig. 1 and shows an end view of the index mechanism shown in Fig. 16.

Figure 17 is a detail view of the locking device for locking the turret carrying the chucks in a stationary position.

Figure 18 is a horizontal section of the locking device shown in Fig. 17 and is taken on the line 18—18 of Fig. 17.

Figure 30 is a sectional view taken in the direction of the arrows 30—30 of Fig. 23 and shows the controlling mechanism for positioning the thread millers in cutting position.

Figure 31 is a detail view showing the chuck release rod and the ejector arm.

Figure 31a is a cross section on the line 31a—31a of Fig. 31.

Fig. 32 is a sectional view of a modified form of dental clutch.

Figures 33 and 33a are diagrammatic views showing the sequence of operations and the movement of the stock as it is presented to the grooving cutters and to the thread millers in the various operations.

Figures 34 and 34a are diagrammatic views showing the operations of the grooving cutters.

Figures 34b and 34c are diagrammatic views showing the operations of the thread millers.

Figure 35 is a diagram showing how the tap is relieved.

Figure 39 is a diagrammatic view showing the sequence of operations and the movement of the stock as it is presented to the cutters in forming a reamer.

Figures 40, 40a, 40b, and 40c diagrammatic views showing how the various cuts are made in forming a reamer.

General structure

Figure 10:
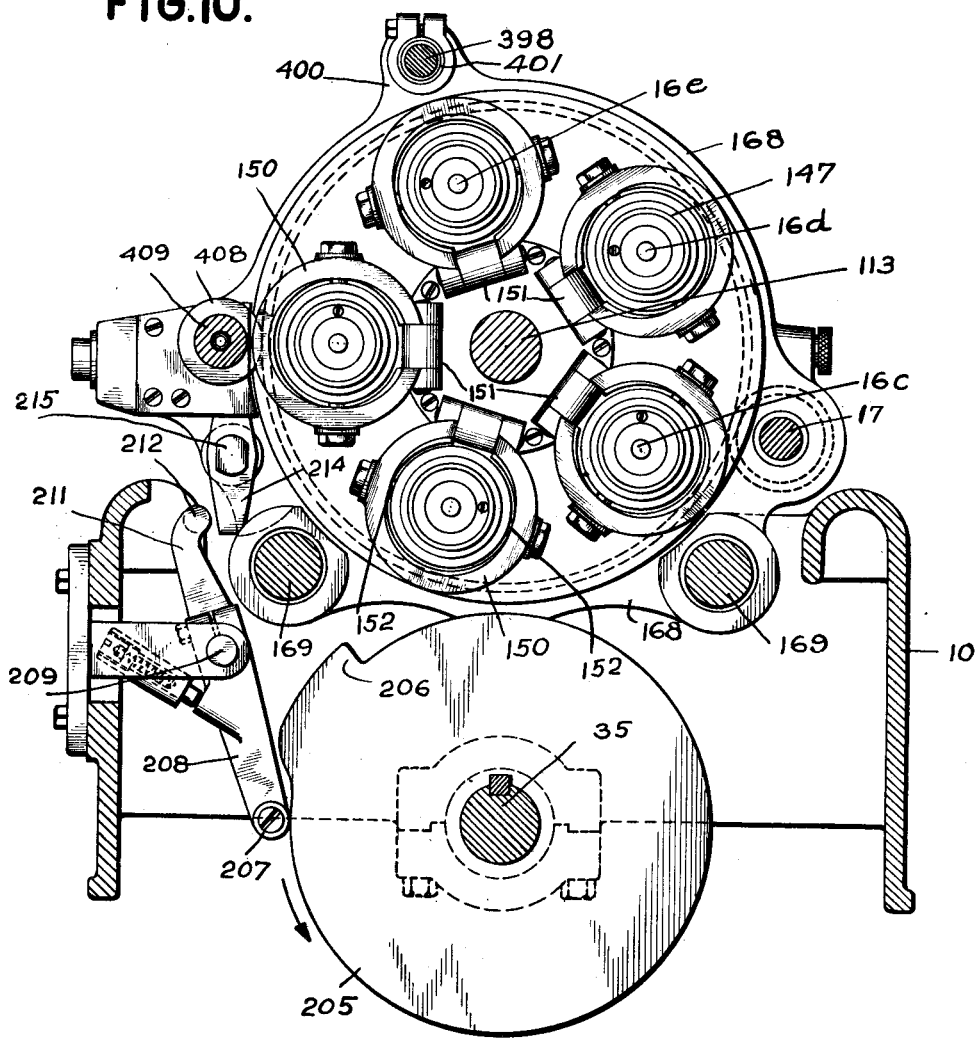
Figure 10 is a transverse section of certain parts taken on the line 10—10 of Fig. 1 showing the work carrier looking from the right.

Referring to Figs. 1, 2, 3, 9 and 20, the machine in general comprises a frame 10 with a drip pan 11 and supporting pedestals 12—12. Upon the frame is mounted a head marked in general 14 which contains the main driving mechanism. A tool holder 15 supports the cutting tools, a turret 16 carries the blanks or pieces of stock step by step to the various work positions, a stock feeding mechanism 17 is for feeding in the raw stock, cutting it off and preparing it to be taken and held by the chucks of the turret head 16. Also the frame supports an index mechanism 19 for rotating the turret head chucks to proper position, and a chuck locking mechanism 18 for clamping the tap blank in the chuck.

The turret 16 is equipped with five chucks or blank holders 16a, 16b, 16c, 16d, and 16e, spaced equidistant about the center shaft, see Fig. 9. The tool holder 15 has five working points 15a, 15b, 15c, 15d, and 15e, see Fig. 20, which coincide with and cooperate with the five chucks 16a—16e.

Referring to Fig. 2. For the purposes of description, the side of the machine where the feeding mechanism 17 and chuck locking mechanism 18 are located will be referred to as the front side of the machine. The end of the machine where the main driving head is located will be referred to as the left hand end and the right hand and rear respectively, as they appear in Fig. 2.

Main drive of machine

Referring to Figures 1, 2, 3, 4, 5 and 6.

The machine is driven by an electric motor M which, through the usual chain and sprocket connection, drives a shaft 20 mounted in the frame of the driving head 14.

A cross shaft 21 is driven by a worm and worm wheel 22—22 mounted on shaft 20 and stub shaft 21. One end of stub shaft 21 is mounted in the side of the housing 14 and the other end is supported by an intermediate partition of the frame 14. The stub shaft 21 extends through the partition and has mounted upon it a spur gear 39. Extending from the partition to outside the housing is a shaft 21a which is socketed in the end of stub shaft 21.

On the outer end of shaft 21a is a pinion gear 24 which drives a compound gear 25—25, by which the gear on shaft 26 is driven. Provision is made for changing the speed of shaft 26 by replacing the idler compound gears 25—25 in the gear train with other compound ratios, see Fig. 6. These gears are mounted on an adjustable arm 52 in a well known manner.

Compound gears 25—25 drive the gear 23 on shaft 26. On the shaft 26 is a worm 27 which drives a worm wheel 28 mounted on the shaft 29, mounted in the driving head, 14. Adjacent to the worm wheel 28, and fastened on shaft 29, is a pinion 33, Fig. 5, which meshes with an idler gear 53, which in turn meshes with a gear 63, whose teeth are cut in a portion of a sleeve 83 mounted in the driving head 14. Splined to this sleeve 83, as shown in Fig. 3, is a long drive shaft 113 which extends through the tool holder 15, turret head 16, and is supported at the right end of the machine by a bearing 13 carried by frame 10.

The shaft 113, through gearing and mechanism, to be later described, drives the cutting tools of tool head 15, the chucks of turret head 16, and various other devices.

Referring in particular to Fig. 4, the shaft 29 extends outside the frame casting of the driving head 14 and has mounted thereon a gear 30. Meshing with gear 30 is an idler gear 31 mounted on the usual slotted links 32—32 so that the idler gear 31 can be changed to one of smaller or larger diameter and the center adjusted to such a position as to keep the idler gear 31 in proper mesh in the gear train. The idler gear 31 is in mesh with a gear 34 mounted on the end of the main cam shaft 35.

The shaft 113 is slidable through the bearing 113 and, as will be described later, is mounted so as to move longitudinally with the turret head structure 16. The left hand end is splined to a driving sleeve 83, see Fig. 3, so that as the shaft is moved to the right by the turret head 16 the shaft 113 is rotated by the splined connection with sleeve 83.

Referring to Fig. 5, the transverse shaft 21, which is driven by the worm and wormwheel 22—22, has splined thereto a double clutch collar 36 having teeth 37 and 38 on either end thereof. The clutch teeth 38 cooperate with corresponding teeth 43 forming part of the gear 39 loosely mounted on the shaft 21. The gear 39 through the back gears 40—40 drives a gear 41 on shaft 21a. The gear 41 has clutch teeth 42 which cooperate with the clutch teeth 37 on the end of clutch collar 36. The clutch collar 36 has a central groove 44 which carries the studs of a yoke 45 pivoted at 46, and having an arm 47 with a cam roller 48, see Fig. 3, which cooperates with a cam 49 mounted on the main cam shaft 35. Mounted on the yoke or lever 45 at 50 is a roller 51 coacting with a spring pressed detent 51a. This acts as an impositive lock and for quickly meshing the teeth of the clutches 38—43 and 37—42 when the clutch collar 36 is moved to the right or left under the influence of the cam 49. The cam 49 has a rise 50a which moves the arm or yoke 45 to the left, see Fig. 5, so that the clutch teeth 42, 37 are engaged and the shaft 21 drives through the splined clutch collar 36, clutch teeth 37—42, gear 41 keyed to the shaft 21a and thus driving pinion 24 which meshes with the gear train 25—25.

At this time the back gears 40—40 and gear 39 on shaft 21 revolve idly.

The cam 49 also carries a part 51b which, when it coacts with roller 48, serves to pull the cam arm 47 inwardly and the arm 45 moves the clutch collar 36 to the position shown in Fig. 5, at which time the clutch teeth 38—43 are engaged, and the shaft 21 drives the splined collar 36, clutch 38—43, gear 39, which is loose on shaft 21, back gears 40—40 and gear 41 fixed on shaft 21a. This revolves the shaft 21a in the same direction, see arrow Fig. 6, but at a much slower speed than when the clutch teeth 37—42 were engaged. The purpose of this reduction in speed will be hereinafter described; suffice to say that the cam shaft 35 constitutes a cycle shaft, and that the cams mounted thereon revolve once for each cycle of the machine.

It is obvious from the foregoing description that the speed of the pinion 24 can be varied during the cycle of the machine and the time of the change of speed be varied by moving the parts 50a and 51b about the periphery of the cam plate 49.

Blank feed mechanism

Referring to Figs. 1, 2, 4, 5, 7, 7a, 8, 8a and 20. Located at the left hand of the machine, see Fig. 1, and alongside the driving mechanism, marked generally as 14, is a stock or blank feeding device 17. This blank feeding mechanism 17 determines the length of the piece of raw stock, cuts it off, and delivers it to that chuck, which at that time is opposite the blank feeding mechanism.

Figure 20:
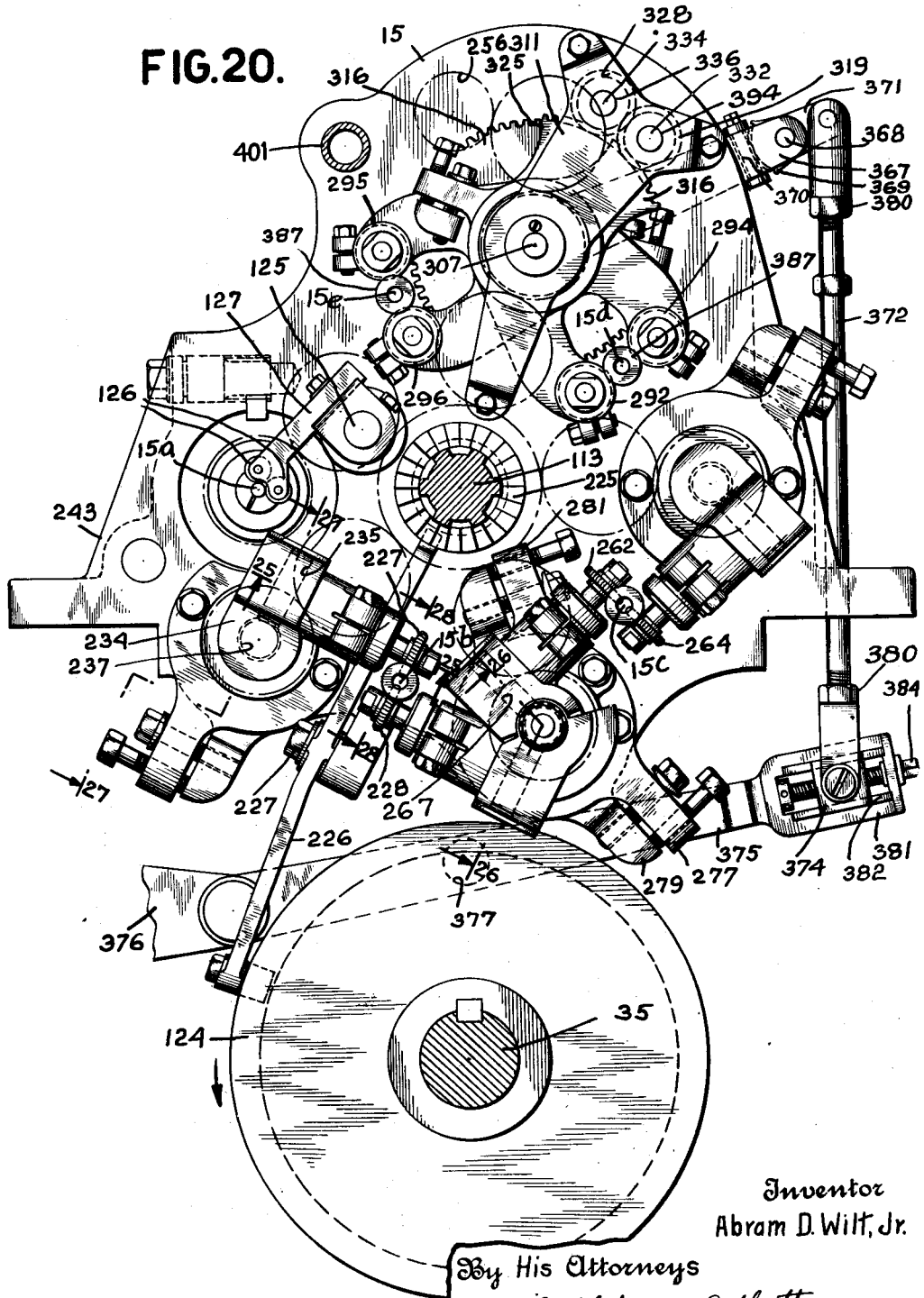
Figure 20 is a transverse section taken on the line 20—20 of Fig. 3 and shows a face view of the cutting tool carrying head which operates on the blanks held in the chucks of the turret head.

The right hand end of the blank feeding mechanism is supported in the tool head 15 at the operating station 15a, see Fig. 20.

Referring to Figs. 1 and 7, the reciprocating rod 54 is slidably mounted at its right hand end in a bearing 55 fixed to the frame 10 of the machine. The left hand end is fixed to a slidable bracket 56 which is mounted in guides 57 formed in the frame 10 of the machine. The slidable bracket 56 carries a bearing 58 in which is rotatably mounted the stock feeding mechanism.

Adjustably mounted on the rod 54 and keyed thereto are adjustable stop collars 59 and 60, see Figs. 1, 2 and 8.

Reciprocating between the stops 59 and 60, and coacting therewith is a roller 61, Fig. 8. The roller 61 is mounted at the upper end of a lever 62, pivoted at 64, which has a dependent arm 65, Fig. 5, carrying at its lower end a cam roller 66, which coacts with a cam groove cut in the surface of the drum cam 67, see Figs. 1 and 5.

The drum cam 67 imparts a reciprocating motion to the lever 62 and its roller 61 at a predetermined time and speed during the cycle of the machine. By adjusting the position of the stop collars 59 and 60, which are splined to the rod 54, it is possible to vary the length of the piece of raw stock fed by this device. The lost motion between the stop collars 59, 60 and the roller 61 varying the amount of stock fed.

Cam 67 on the cycle shaft 35 makes the feeding of the stock take place at the proper time in the cycle of operation of the machine. In other words, the cam 67 produces a maximum reciprocating motion of the roller 61 and the amount of lost motion between the adjustable stops 59 and 60 varies the effective amount of the feed.

The sliding block 56 has an extension in which is mounted the sleeve 68, see Fig. 7, whose inner surface forms the bearing 58. The sleeve 68 is prevented from rotating by the usual pin construction. Mounted within the bearing 58 is a sleeve 69 which is locked in position by the collar 70.

Slidably mounted within the sleeve 69 is a long tube 71, see Figs. 7, and 7a. At the right hand end of the tube 71, see Fig. 7a, is a clutch feeding device 74 of a well known type. This clutch embraces and coacts with the rod of raw stock 72. When the clutch 74 on the tube 71 releases the raw stock 72, and when the tube 71 is moved to the right, the clutch collar 74 grips the rod of raw stock 72 and feeds the stock to the right, see Fig. 7a.

The sleeve 69 is keyed to the tube 71 by the pin 75 so that they rotate together. Tube 71 is held in proper relation to sleeve 69 by being locked between the shoulder 76a and the locking collar 76.

At the delivery end of the stock feeding mechanism are bifurcated stock clamping jaws 77. These jaws are forced together by the conical surface forming a part of the retaining collet 78.

Abutting the end of the piece forming the jaws 77 is a sleeve 79 which has at its forward end a hardened collar 80. Jaws 77, sleeve 79, and collar 80 are mounted within a sleeve 81 which carries at its right hand end the collet 78 before mentioned. The left hand end of this sleeve 81 is mounted in a bearing 82 fixed to the frame of the machine. The left hand end of the sleeve 81 is splined to the tube 71 by means of the splines 84—84 so that they revolve together, but tube 71 moves freely longitudinally within sleeve 81, under the control of slidable bracket 56.

Within the tool head 15, at the work station 15a is a bearing block within the tool head 15 which is controlled by a rack bar 86 whose ends embrace the block 85, see Fig. 7a. The pinion 87 meshes with the rack 86 and its shaft extends to the outside of the tool head 15, where it has a squared nut 88 for use with a wrench. This arrangement allows the operator to adjust the bearing block 85 with regard to the tool head 15.

Mounted inside the block 15 and locked therein by retaining collars 89 and 90, see Figs. 7a and 8a, is a bearing 91, within which the sleeve 81 revolves. The sleeve 81 is retained in position as regards the bearing block 85 by means of the shoulder 92 and the lock collars 94 and 89.

Mounted on sleeve 81 and keyed thereto by key 95 is a short outer sleeve 96, see Fig. 7a. The sleeve 96 has gear teeth cut in the outer surface at 97, see Fig. 22, at work station 15a by means of which the two sleeves 96, 81, and tube 71 are revolved.

The gear teeth 97 cut in the outer surface of sleeve 96 mesh with an idler gear 123, mounted on tool head 15. The idler gear 123 meshes with a pinion gear 244 mounted concentric with shaft 113, see Fig. 22. The gear 244 is driven in a manner that will be described later. The sleeve 96 is locked in position longitudinally as regards sleeve 81 by means of the locking ring 98 coacting with washer 99 fastened to the end of sleeve 96 and locked by collar 100. Mounted in sleeve 96 are a plurality of dogs 101 which coact with the hardened collar 80 before mentioned, see Fig. 7a.

The tails 102 of these dogs 101 rest against the surface of the collar 104. Collar 104 is loosely mounted in a controlling bracket 105, which is adjustably secured to a slide block 106 mounted in the frame of the machine. Slide block 106 is reciprocated by means of a lever 107 pivoted at 108 having at its lower end a cam roller 109 coacting with a cam groove cut in the surface of the right hand end of drum cam 67, see Figs. 1 and 5.

The operation of this feed head is as follows: With the parts in position shown in Figs. 7, 7a, the rod of raw stock has at the previous operation been cut off at 110 and grooved at 111.

Referring to the diagram shown in Fig. 33, it will be seen that each tap consists of a shank portion 93 and cutting portion 103 separated by the groove 111.

The stock is tightly gripped by the bifurcated jaws 77 through the action of the dogs 101 being pressed against collar 80, their tails 102 resting against the surface of the collar 104. The clutch 74 is at its extreme left hand position.

At the proper time in the cycle of the machine the slide block 106, under the influence of the cam groove cut in drum cam 67, moves to the right, freeing the dogs 101 and so releasing the bifurcated jaws 77 from the rod of raw stock 72, see Fig. 8a. As soon as this occurs the slide block 56 begins to move to the right, the clutch 74 at the right end of tube 71 grips the stock and begins to feed it to the right until it reaches the position shown in Figs. 8 and 8a. This feeds the stock an amount equal to the length of the tap which is being manufactured, feeds the shank 93 into the jaws of the chuck mounted at the work position 16a, see Fig. 9 and diagram Fig. 33.

When the feeding of the raw stock has ceased, the collar 105 moves to the left, clamping the bifurcated jaws 77 down on the stock. The sliding block 56 now moves to the left, under influence of the cam cut in cam drum 67, as before described. The clutch 74 slides freely over the rod of raw stock 72 until the parts come to rest in the position shown in Figs. 7 and 7a.

The entire feeding device 17 has been constantly rotated by drive gear 244 which meshes with the teeth 97 cut in the outer surface of sleeve 96. Therefore, the rod of raw stock 72 is rotated all the time that the jaws 77 are clamped against the stock. This rotation of the rod of raw stock is utilized for cutting of the tap blank and cutting the groove 111 therein as will be hereinafter described.

It is obvious that by changing the clamping jaw 77, clutch 74, and collar 73, see Figs. 7 and 7a, that the diameter of the rod of raw stock can be varied within the limits of the machine.

*Cutting off of blank*

Referring to Figs. 1, 2, 3, 5 and 33: As shown in Fig. 33 after the stock has been fed through the feeding device and shank 93 of the tap blank has pressed into the mouth of the chuck at work position 16a, the blank is cut off and chamfered by tool 112 and grooved by tool 114. The tools 112 and 114 are clamped in a tool holder 115 slidably mounted in bracket 116 which is adjustable along the rail 117 forming part of the frame 10 of the machine, see Fig. 2.

The tools 112, 114 are fed forward in their cutting action by means of lever 118 adjustably pivoted at 119. The pivot 119 forms part of a vertical stub shaft mounted in bracket 120. This stub shaft has at its bottom end a lever 121, Fig. 5, having at its outer end a cam roller 122 which coacts with a cam groove cut in the left hand end of drum cam 124 mounted on cycle shaft 35.

It is apparent from this description that the tools 112 and 114 can be fed into cutting position as shown in Fig. 33 and can be returned from cutting position by the contour of the cam groove cut in drum cam 124, and at the same time the speed of cutting off and grooving can be determined by the same means.

It is also apparent that the tools 112 and 114 can be spaced apart different distances on the tool clamp which can also be positioned on the rail 117 so as to locate the tools 112 and 114 in different positions in relation to the tool head 15.

In other words, the distance between the tools and their position in regard to the length of stock fed can be adjusted so as to coordinate them with the different lengths of stock which the feeding device will feed, in order that taps of varying lengths can be manufactured.

The position of the groove 111 in relation to the ends of the blank can be varied so as to make the cutting portion longer or shorter. When the rod of raw stock is of small diameter it is generally necessary to support the rod near where the cutting off and grooving is taking place. For this purpose there is shown a stud 125, see Fig. 20, rigidly secured to the tool head 15. The stock rod is supported by rolls 126 mounted in a bracket 127 adjustably secured to the stud 125.

Turret and chuck mechanism

Referring to Figs. 1, 2, 9, 10, 11, 12, 13 and 14, mounted in the turret head 16 are five chucks for holding the shanks 93 of the taps being manufactured. These chucks 16a, 16b, 16c, 16d, and 16e correspond to, and, when the turret is at rest, are opposite to, the work stations 15a, 15b, 15c, 15d, 15e. As the turret is revolved from one position to another, the chuck 16a passes from work station 15a to 15b, and then from 15b to 15c, and so on.

Referring now in detail to Fig. 12: Each chuck consists of a tube 128 which has mounted within it the split jaws 129, the jaws 129 being formed on the end of a mandrel 130. At the end of the mandrel 130 is a hardened steel collar 131 which coacts with a plurality of dogs 132 pivoted on pins 134. As shown in Fig. 14, these dogs 132 are three in number.

The tube 128 is mounted in a bushing 135 which fits into a portion of the head 16. At one end is a ball thrust bearing 136 and at the other end a retaining washer and lock nuts 137.

The jaws 129 formed on the end of tube 130 are held together by the conical surface forming a part of the collet 138 which is secured to the end of sleeve 128. Between the collet 138 and the ball thrust is a pinion gear 139 which meshes with a central driving gear 140, see Fig. 9. Pinion gear 139 is keyed to the sleeve 128 so that when the central gear is rotated the five chucks 16a, 16b, 16c, 16d and 16e are rotated, as will be hereinafter described.

The three dogs 132 are pivoted, as before described, on pins 134. Pins 134 are carried by a short sleeve 141, and within which the chuck sleeve 128 is secured. Fastened to the short sleeve 141 is a washer 142 which fits into a groove in collar 144, which is threaded on to sleeve 128, the collar 144 being locked in position by locking collar 145. The sleeve 129 is additionally secured by set screw 146.

Mounted outside of the short sleeve 141 is a sliding collar 147, whose function is to control the action of the dogs 132. When the collar 147 is in the position shown in Fig. 12 the dog 132 is pressed against the hardened steel collar 131, which action forces the mandrel 130 with its split jaws 129 against the inclined surface of the collet 138 and so clamping the jaws 129 on the shank 93 of the tap being manufactured. When the collar 147 moves to the left the tails of the dogs are released by their dropping over the edge 148 of recess 149. The collar 147 is operated in its sliding motion on short sleeve 141 by means of a yoke 150 pivoted at 151 near the center, see Figs. 10 and 13. The yoke 150 carries two sliding blocks 152 which engage a groove 154 cut in the outer surface of sliding collar 147.

It will thus be seen that the movement of the yoke 150 toward the turret head will release the jaws 129, while a movement away from the turret head will force the dogs 132 into the position shown in Fig. 12. The time of this operation in regard to the cycle of the machine will be hereinafter described.

At the right hand end of sleeve 128, see Fig. 12, is a threaded bearing 155. Within the bearing 155, and splined thereto by plate 156 is a spindle 157 which terminates at the left in a spring seat 158. The spindle 157 is free to slide within bearing 155. Threaded to the spindle 157 is another spindle 158 which is free to slide in a bearing 159 formed within mandrel 130. Pinned to spindle 158 at its left hand end is an ejector pin 160. Interposed between the shoulder 161 formed by mandrel 130 and spring seat 158a is a spring 162 which keeps the spindle 157, spindle 158, and ejector pin 160 to the right as shown in Fig. 12. Movement of ejector 160 to the left, see Fig. 12, by pressure being applied to spindle 157, when the jaws 129 are released, will cause the shank 93 of the tap being manufactured to be pushed out of the jaws 129.

The yokes 150 are pivoted to a retaining plate 164 which forms part of the turret structure 16, see Fig. 11.

The five chucks 16a, 16b, 16c, 16d and 16e are exact duplicates of each other and are held in position in a rotating turret 165 by the right side of the ball thrust 136 and the retaining washer and lock nuts 137, as shown in Fig. 11. The rotating turret 165 is mounted on a double ball bearing 166 supported on shaft 113, which reaches from the driving head 14 to the right hand end of the machine, as has been described and is shown in Fig. 3. The turret 165 fits into a turret casing 168, which also forms a support. The turret casing 168 is mounted on guide rods 169, 169 fixed in the frame of the machine. There is provided a cover plate 170 which encloses the gears 139, 139 and drive gear 140, see Fig. 11. This cover plate 170 is provided with felt dust exclusion washers 171. This turret head structure, which slides on the guide rods 169, is shown as a unitary structure in Figs. 10 and 11.

Referring to Figs. 3 and 11: The turret casing 168 has mounted upon the lower side a cam roller 173 which coacts with a cam groove cut in surface of a barrel cam 171 which is mounted on the cycle shaft 35. This cam 171 causes the turret structure to move from the position shown in Fig. 3 to the right a distance sufficient to remove the taps from the cutting tools so that the turret 165 can revolve to a new index position. It is at the end of this right hand movement of turret structure 16 that the end of a spindle 157 comes in contact with a stationary cam 143 see Fig. 1, which presses the spindle to the left, as shown in Fig. 12, and the ejector pin 160 pushes the finished tap out of the jaws 129.

On the outside of the turret 165, which revolves in the turret casing 168, are cut gear teeth 174. These gear teeth 174 mesh with a pinion 175, see Fig. 9, which forms a part of the index mechanism 17.

As before stated, central driving gear 140 is in mesh with each of the five pinion gears 139, which form a part of each of the chuck mechanisms 16a, 16b, 16c, 16d and 16e.

In order to present a new surface for the grooving and threading tools to operate on, each tap blank is rotated 90°, during the cycle of the machine, with respect to its previous index position. This is accomplished in the following manner. Referring to Fig. 9, the central gear 140 and the chuck rotating gears 139 have ratio of two to one. As the work positions are 72° apart and the central gear 140 is stationary it follows that when the turret head gear 165 is rotated, by its index mechanism from one work position to the next the gear 139 will roll around the surface of central gear 140 and will rotate the chuck 144° with respect to its previous position. This position is corrected when the blanks are revolved in a reverse direction 54° during the thread milling operation; by the use of a dental clutch. Referring to Fig. 3, the hub of the gear 140 extends to the left in the form of a sleeve 221 and terminates in a flange which has clutch teeth 222 cut in the side thereof. The manner in which these clutch teeth 222 cooperate with other clutch teeth 224 will be described later.

Referring now to Figs. 3 and 11: The hub of the gear 140 also extends to the right in the form of a sleeve 424 which extends through the turret gear 165 and supports the double ball bearing 166 which has been previously described. Fixed to the right hand end of the sleeve 424 is a flanged member 425 having an annular V groove 426. This groove cooperates with a spring pressed brake pin 427 mounted on the frame of the machine. When the turret head is in its right hand or index position, the pin 427 presses in the groove 426 and serves to hold the gear 140 stationary, while the rotating gears 139 are revolved around it during the index movement. When the turret 16 moves toward the left the annular groove 426 moves away from the spring pressed brake pin 427 and the gear 140 can be revolved by the dental clutch before mentioned.

*Turret head index mechanism*

Referring to Figs. 2, 9, 10, 11 and 16: When the stock feeding mechanism delivers a tap blank to the work position 15a and the shank 93 has been gripped by the jaws 129 of the chuck 16a, which in the position shown in the drawing is opposite work position 15a, the turret head 16 is moved to the right, see Fig. 2, under the influence of cam 171, see Fig. 3.

When the turret head 16 has moved to the right, the entire distance of its travel, the tap blank is entirely clear of the cutting-off tool. It is now necessary to move the chuck 16a and its tap blank to such a position that the tap blank is opposite the tool mounted at work position 15b. In order to do this, as there are five work stations, it is necessary to move the turret 165 one fifth of a revolution. This is accomplished by the following mechanism.

Pinion gear 175, see Fig. 9, is in mesh with the teeth 174 cut in the outer surface of rotating turret gear 165, and is mounted on the end of shaft 176, which extends to the right hand end of the machine and is supported by a double bearing 177.

Referring in detail to Fig. 15, which view is taken looking from the rear of the machine. The bearings 177 are formed in the main frame 10 of the machine; splined to the shaft 176 is a sleeve 178 which runs in the bearings 177. A pinion gear 179 is loosely mounted on sleeve 178 and has on its side clutch teeth 180, which cooperate with clutch teeth cut in the side of a collar 181, which is splined to the sleeve 178. The position of the clutch collar 181 is controlled by a lever 182 which is pivoted at 184 and has at its lower end a pin 185, which cooperates with a groove in collar 181. By use of the lever 182 the clutch 180 can be disengaged and the shaft 176 ceases to rotate and the turret head 165 remains stationary. Due to the fact that the shaft sleeve 178 is splined to the shaft 176 the turret head structure is free to move back and forth, the shaft 176 and pinion 175 being rotated by gear 179.

Pinion gear 179 meshes with gear 186 which is keyed to the hub of a pinion gear 187. These two gears 186 and 187 are loosely mounted on a stud 188 supported in the frame 10 of the machine. Pinion 187 is in mesh with an idler gear 189 mounted on the frame of the machine, see Fig. 16.

The idler gear 189 meshes with a gear 190 which has a stud portion 191 formed on it which is loosely mounted in bearing 192 and is retained in position by collar 194. The gear 190 carries upon its inner surface three rollers 195 which coact with a Geneva stop motion, see Fig. 16.

Mounted on the cycle shaft 35 is a disc 196 which has a projection 197. Fastened to the projection 197 is a substantially triangular driving plate 198, and adjacent to the triangular plate 198 are the ends 199 and 200 of an annular portion 201 mounted on the surface of the disc 196. Between the triangular plate 198 and the part 199 of the annular portion 201 is formed the inlet slot 202 of the Geneva stop, and between plate 198 and part 200 is formed the egress slot 204 of the Geneva stop.

When the triangular plate 198 strikes one of the rollers 195, see Fig. 16, it rotates the gear 186 one-third of a revolution, the roller 195 passing to a position within the annular portion 201 and another roller passing through the egress slot 204 to a position outside the annular portion 201.

The parts just described form a well known type of Geneva stop motion and need no further description. The train of gears comprised of gears 190, 189, 187, 186 and 179 are so proportioned that one-third of a revolution of gear 190 will rotate the pinion 175, on the end of shaft 176, sufficiently to rotate the turret gear 165 one-fifth of a revolution. This moves the tap blank from work position 15a to 16b, and on the next revolution of the cycle shaft 35 from work position 16b to work position 16c, and so on.

Turret head lock

Referring to Figs. 1, 3, 10, 17 and 18: During the time that the Geneva stop motion is not rotating the turret head 165 it is necessary to lock the turret head accurately in the index position.

Mounted on cycle shaft 35 and attached to a drum cam adjacent thereto is a cam 205 which effects the locking and unlocking of the turret head 165. Coacting with the rise 206 of cam 205 is a cam roller 207. This cam roller 207 is mounted on the lower end of a spring pressed lever 208, pivoted at 209, on a stub shaft 210 mounted in brackets secured to frame 10 of the machine, see Fig. 1. Mounted on stub shaft 210 are two upwardly extending arms 211 which carry between them a cylindrical portion 212.

When the turret structure 16, under the influence of drum cam 171 is at its farthest right hand position, the lock lever 214, see Fig. 17, is in a position to coact with the cylindrical portion 212 of lever arms 211. Locking lever 214 is pivoted at 215 to the frame portion 168 of the turret structure 16.

Referring to Figs. 17 and 18: Turret head 165 has mounted upon it at five adjacent points a hardened steel piece 216 having a locking slot 217. Coacting with locking slot 217 is a lock bolt 218, mounted in a portion of the turret frame and pressed by spring 219 in a direction to hold it locked. The upper end of lever 214 passes into a slot 220 formed in bolt 218, and has its end formed so that if the lower end of lever 214 is pressed to the right, see Fig. 17, the bolt 218 will be withdrawn from the slot 217 and the turret head 165 will be unlocked. When the raised portion 206 of cam 205 rotates lever 208 clockwise, see Fig. 10, the cylindrical portion of lever 212 will move the lower portion of lever 214 to the right and this will unlock the turret head 165.

When the turret structure is in its right hand position the turret head 165 is in a position to be unlocked and it is while the turret head is unlocked that the Geneva stop motion rotates the turret head 165 one-fifth of a revolution, i. e. to a new index position.

Structure and operation of fluting tools

Referring to Figs. 1, 2, 3, 19, 20, 22, 24, 25, 26, 27 and 28:

The tool carrying head 15 has the delivery end of the blank feed mechanism mounted at work station 15a, fluting cutters at 15b and 15c, and thread milling cutters at 15d and 15e. The tool carrying head 15 is rigidly secured to the frame 10 of the machine. It carries on its right face the fluting and thread milling cutters, see Fig. 20, and on its left hand face a gear train for rotating the cutting tools, see Fig. 22. On the left hand face of the tool head 16 are also mounted mechanism for bringing the cutting tools into engagement with the work and for withdrawing them after the work is finished, see Fig. 19. Various other devices are mounted on the tool head for positioning and adjusting the various tools.

All these devices will now be described in the order in which they perform the various operations on the tap blank. When the tap blank has been delivered to the jaws 129 of the chuck 16a, and the chucks carried by the turret head 16 have moved to the right, the index mechanism 19 rotates the turret gear 165 until the chuck 16a stands opposite to the tools at work station 15b.

The central gear 140 of the chuck head meanwhile has rotated the blank but without any effect, as the blank is still cylindrical. The turret 16 now moves to the left causing the blank to be machined by the tools mounted at work position 15b.

There are mounted at the work position 15b two grooving cutters 227, and 228, see Fig. 20, which cuts two oppositely disposed grooves in the blank, as is shown in Fig. 34.

Figure 25:
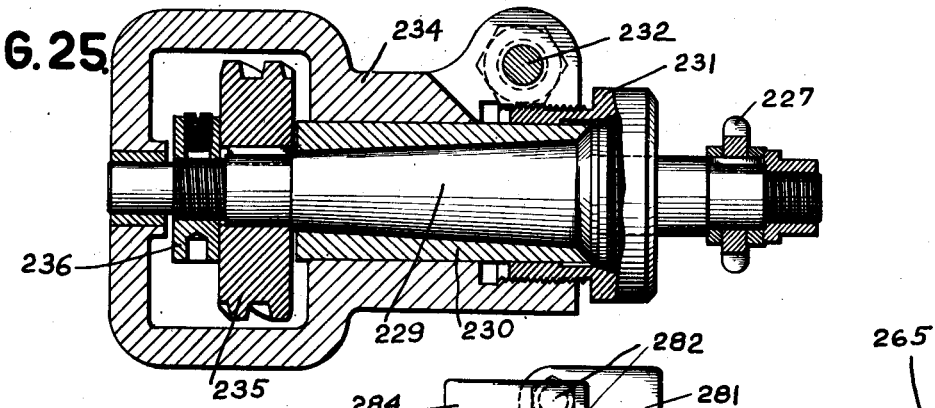
Figure 25 is a sectional view taken on the line 25—25 of Fig. 20 and shows one of the grooving cutters and its spindle and driving gear.

The fluting cutter 227 is mounted on a taper mandrel 229 and keyed thereto in the usual manner, see Fig. 25. The mandrel 229 is mounted in a sleeve 230 and adjusted for cutter position by means of screw collar 231 and clamping bolt 232. The sleeve 230 is mounted in a pivoted frame 234. Keyed to the rear of the mandrel is a worm wheel 235 and held by lock collar 236. Pivoted frame 234 forms a housing for these parts.

Figure 27:
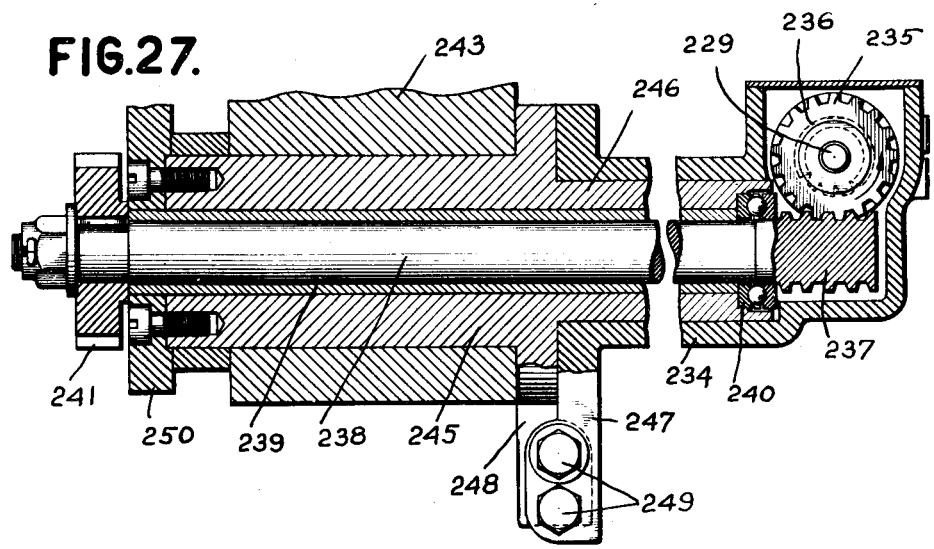
Figure 27 is a sectional view taken on the line 27—27 of Fig. 20 and shows the drive for one of the grooving cutters.

Worm wheel 235 is driven by worm 237 which is made integral with its shaft 238, which is rotatably mounted in a bushing 239, see Fig. 27. A ball thrust 240 is provided for taking up the thrust of the worm 237 and at the left hand end of shaft 238 is keyed a driving gear 241. Driving gear 241 meshes with an idler gear 242, which in turn meshes with a central gear 244, which is loosely mounted concentric with central drive shaft 113, see Figs. 21, 22 and 24.

Figure 21:
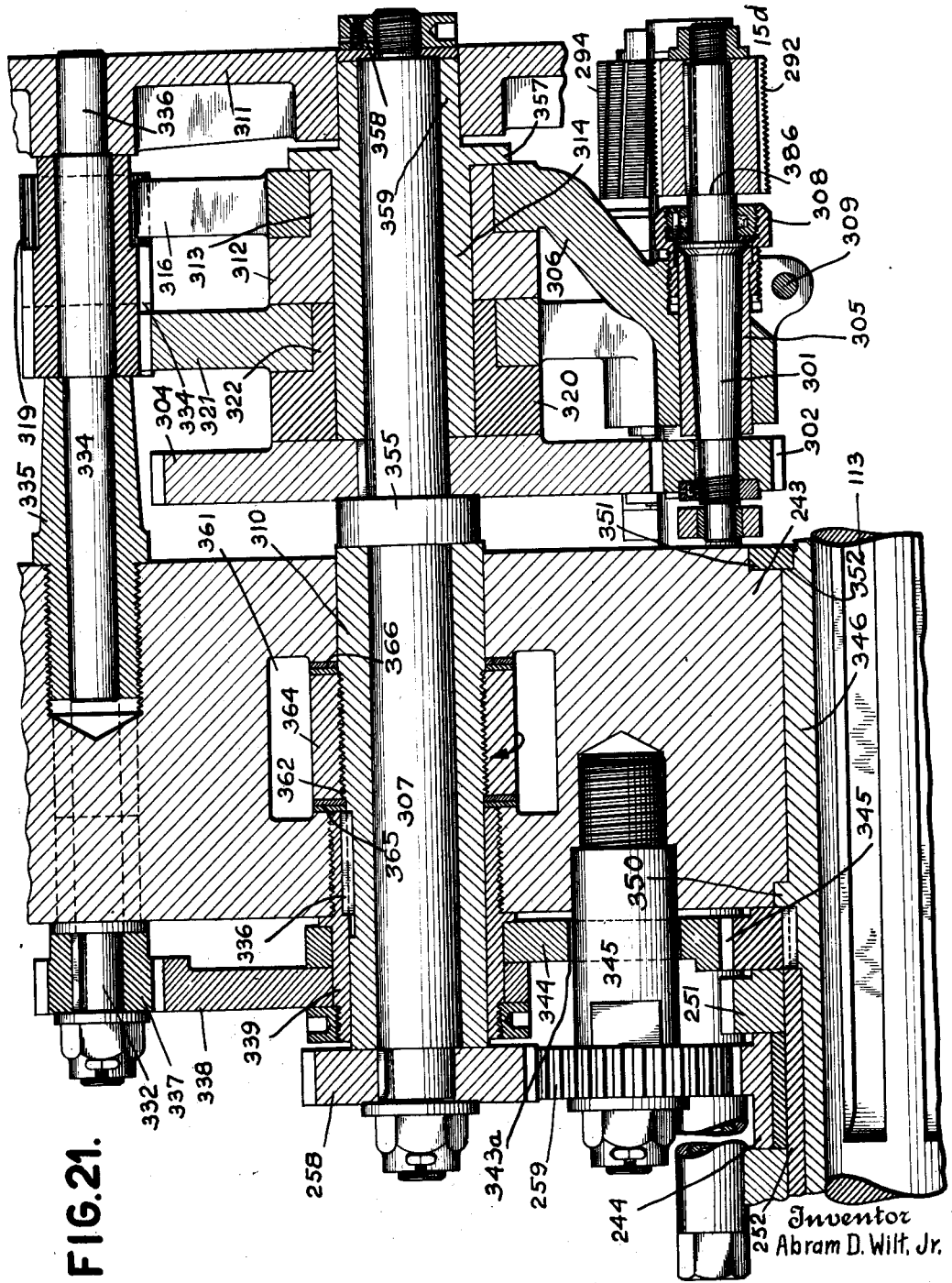
Figure 21 is a central longitudinal section of a portion of the cutting tool carrying head taken on the line 21—21 of Fig. 23.
Figure 24:
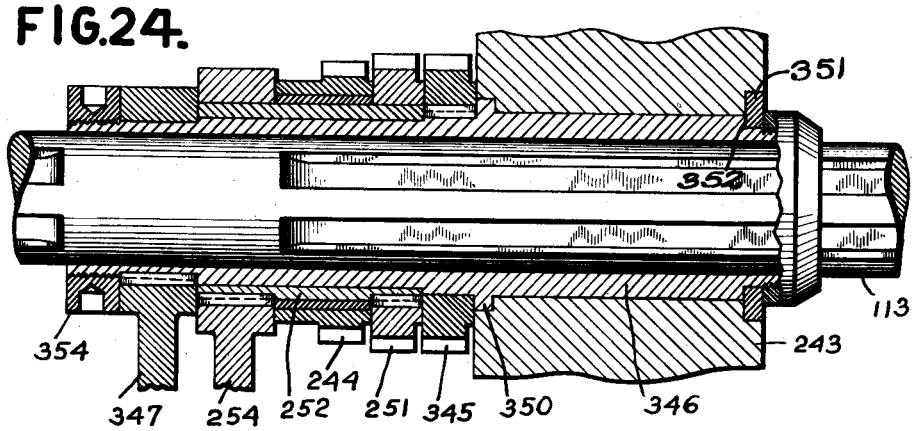
Figure 24 is a central longitudinal section of the central shaft showing the drive to the flute cutters and the thread milling cutters.

Extending through the main supporting casting 243 of the tool head structure 15 is a sleeve 245 which at its right hand end supports the ball thrust 240. On the extension 246 of sleeve 245 is pivoted the housing structure 234 having an extension 247, which cooperates with an extension 248 forming a part of sleeve 245. These two arms or extensions 247, 248 are furnished with adjusting screws 249 for adjusting the relative position of the sleeves 245 and gear housing 234. On the left hand end of sleeve 245 is mounted a quadrant 250, see Figs. 19 and 27. The quadrant 250 meshes with a central pinion 251 which is keyed to a sleeve 252 mounted on the central drive shaft 113, as shown in Figs. 21 and 24. Keyed to the other end of sleeve 252 is a cam arm 254 having a cam roller 255 at its lower end, which coacts with a cam groove cut on the right hand side of disc 256 which is keyed to cycle shaft 35, see Fig. 3. The contour 257 of this cam appears in dotted lines in Fig. 22, and is so proportioned that at the proper time the gear 251 is rotated, and the quadrant 250 moved so as to bring the fluting cutter 227 up against the work.

Figure 19:
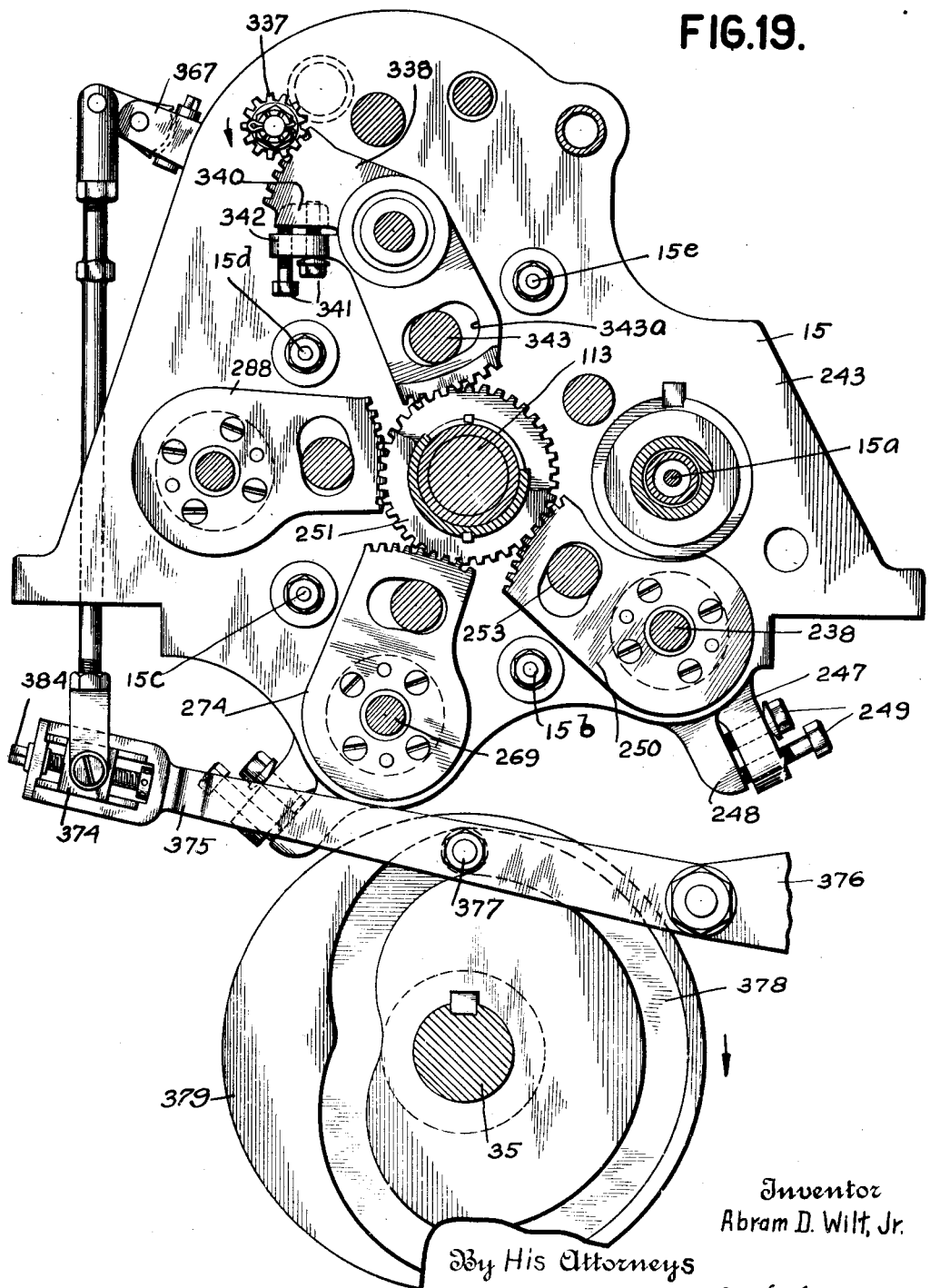
Figure 19 is a transverse section of certain parts taken on the line 19—19 of Fig. 3 and showing the rear face of the tool carrier.

The idler gear 242 is mounted on a stud 253 secured to tool head 244. This stud 253 passed through a slot in quadrant 250, as shown in Fig. 19.

The fluting cutter 227 is rotated, as before stated, by the gear 244, idler gear 242 and gear 241 and gear 235, which is mounted on the taper spindle 229.

As previously described, the main drive housing 14 supports a shaft 20 which has mounted on the left the sprocket, which is driven by the motor and carries the worm 22, which meshes with a worm wheel mounted on the transverse shaft 21.

Referring to Fig. 3, the shaft 20 extends from the main drive casing 14, to the right, and this has its outer end supported in a bearing 555 formed in the tool head casting 243. Mounted on this shaft is a pinion 256, which meshes with an idler gear 257b, see Fig. 22.

Idler gear 257 meshes with gear 258, which gear is the main driving gear for the threading tools which are located at work stations 15d and 15e. The drive gear 258 meshes with an idler gear 259, which in turn meshes with the central gear 244 mounted concentrically on shaft 113, as previously described.

This train of gears forms the main drive for the various tools mounted at work positions 15b, 15c, 15d, and 15e in the tool head frame 243.

Therefore, when the turret head 16 starts to move to the left and presents the tap blank mounted in the chuck 16a to the tools mounted at work position 15b, the cam groove 257 of cam disc 256 will cause the fluting cutters 227, 228 to approach each other. The fluting cutters 227, 228 are continuously rotated by the gearing previously described. Just before the tap blank reaches the cutters, the end of the blank passes into a tubular support 257a, see Fig. 28. This tubular support is mounted in and keyed to a bushing 258 which is secured in the tool head 243. On the left side of tool head 243 is a feed pipe 259, screwed into the end of bushing 258, and supported by a sleeve 260, which is secured to the tool head 243. The tubular support has slots cut in it at 261 through which the cutters 227 and 228 operate. By proper connections to a supply, oil or cutting fluid may be forced through the pipe 259 and tubular support 260 to the point where the fluting cutters are cutting the oppositely disposed flutes in the tap blank.

At the work station 15c, see Fig. 20, are two fluting cutters 262 and 264. The fluting cutter 228 of work station 15b and fluting cutter 262 of work station 15c are mounted at a common pivotal point 265. The two fluting cutters 228 and 262 are mounted on taper spindles with drive gears at the ends of the spindles just as fluting cutter 227 is mounted. This structure has been previously described and is shown in Fig. 25.

Cutter 228 has worm gear 266 mounted on its taper spindle and cutter 262 has worm gear 267 mounted on its spindle.

The two worm gears 266, 267, mesh with a common worm 268 mounted at the pivotal point 265. Worm 268 is made integral with its shaft 269, see Fig. 26, and is mounted in a similar manner as worm 237, as shown in Fig. 27. At the left hand end of the shaft 269 is a drive gear 270. Gear 270 meshes with an idler gear 271 which in turn meshes with central gear 244. The drive is similar in all respects as the drive of shaft 238.

Figure 26:
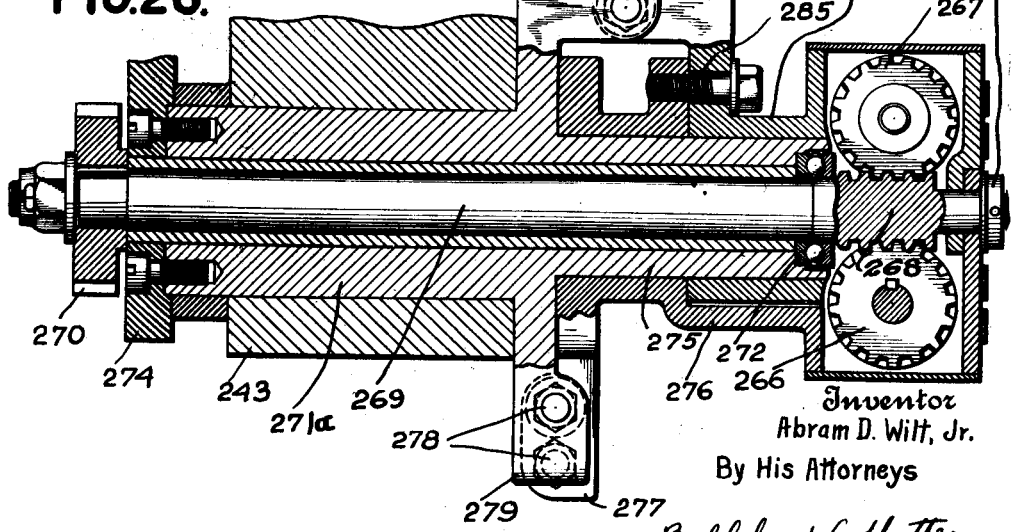
Figure 26 is a sectional view taken on the line 26—26 of Fig. 20 and shows the drive for a pair of the grooving cutters.

Extending through the supporting casting 243 of the tool head structure is a sleeve 271a, see Fig. 26. The mounting and operation is similar to sleeve 245, shown in Fig. 27. The sleeve 271a carries at its right hand end a ball thrust 272 and at its other end a quadrant 274. Mounted on an extension 275 of sleeve 271a is a housing 276 which supports the worm wheel 266 and mounting for fluting cutter 228. An extension 277 having adjusting screws 278 cooperates with an extension 279 which forms a part of sleeve 271a.

Also mounted on extension 275 of sleeve 271a is a housing 280 which supports the worm wheel 267 and mounting for fluting cutter 262. An extension 281 having adjusting screws 282 cooperates with an extension 284, forming a part of sleeve 271a. With this construction it is possible to adjust the fluting cutters 228 and 262 relative to their respective work stations 15b and 15c. After adjustment the two gear housings 276 and 280 are secured together by the set bolt and slot construction shown at 285, see Fig. 26.

Referring to Fig. 19: The quadrant 274 meshes with central pinion 251 which, as before described, is keyed to a sleeve 252 mounted on the central drive shaft 113, see Figs. 21 and 24.

When the cam arm 254 moves the quadrant 250 to move fluting cutter 227 in and out from the tap blank, it will also move fluting cutter 228 at work station 15b and fluting cutter 262 at work station 15c in and out from tap blanks at their respective work stations.

Fluting cutter 264 which cooperates with fluting cutter 262 at work station 15c is mounted exactly like fluting cutter 227 at work station 15b and which has been previously described.

Figure 22:
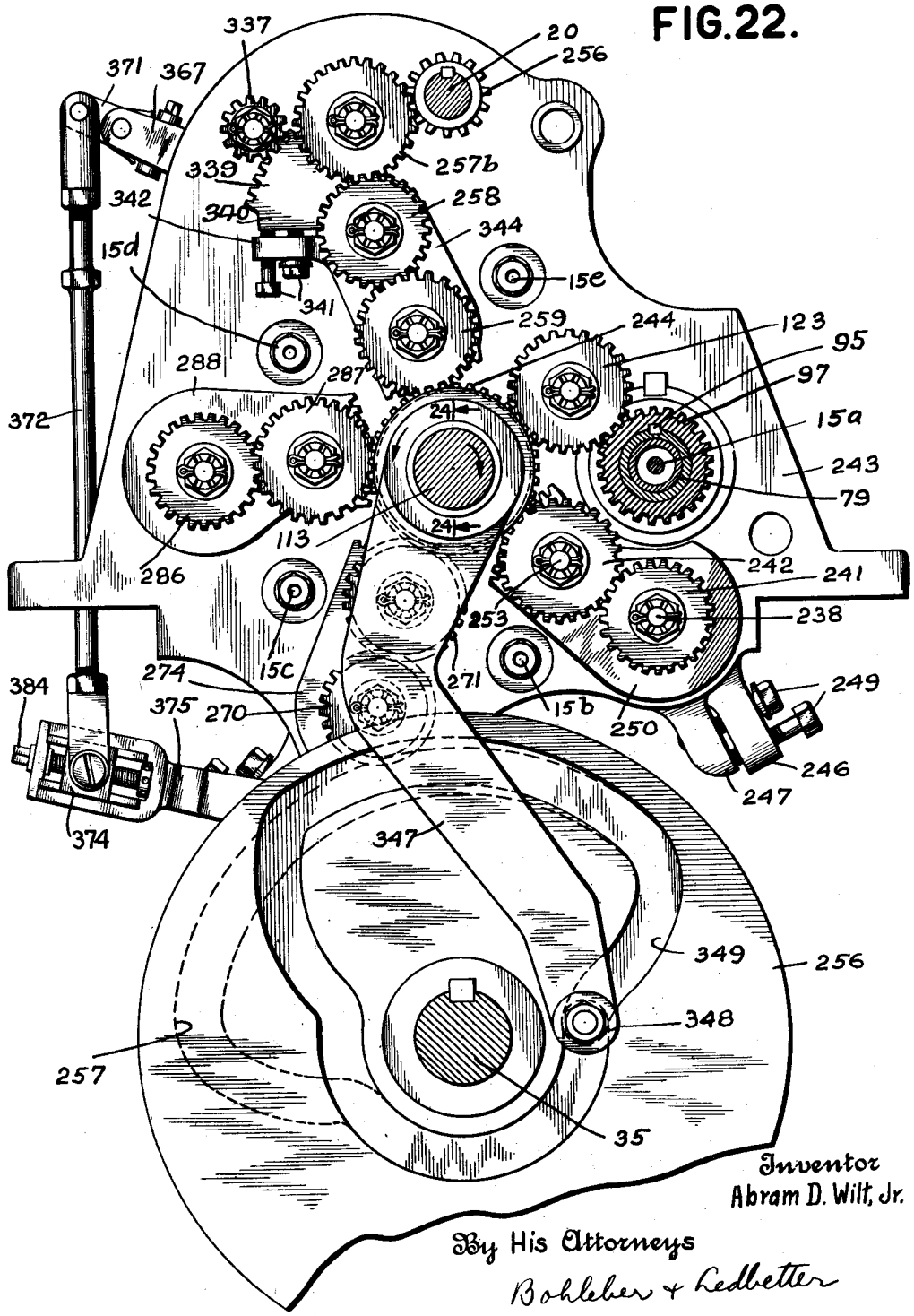
Figure 22 is a transverse vertical sectional view taken on the line 22—22 of Fig. 3 and shows a face view of the driving mechanism which controls the flute cutters and thread millers on the rear face of the cutting tool carrying head.

Fluting cutter 264 is driven by gear 286 which meshes with idler gear 287, which in turn meshes with central gear 244, see Fig. 22. The fluting cutter 264 is moved in and out of cutting position by the quadrant 288, which meshes with pinion 251. As before described, pinion 251 is moved by cam lever 254.

It will be seen from the preceding description that the quadrants 250, 274 and 288 all mesh with central pinion 251 and that the movement of cam arm 254 will cause the fluting cutters 227, 228, 262, and 264 to move in unison.

Fluting cutters 227, 228 cut oppositely disposed flutes 223 in the tap blank at work station 15b, as shown in Fig. 34. The turret head now moves the tap blank to work station 15c and at the same time the tap blank held in one of the chucks of the turret 15 is rotated so that on the next movement of the turret head 16 to the left, see Fig. 3, the fluting cutters 262, 264 cut oppositely disposed flutes 263 in the tap blank at a point 180° from the flutes cut by cutters 227, 228; or in other words, half way between the previously cut flutes, as shown in Fig. 34a.

The fluting cutters 227, 228, 262 and 264 can be adjusted so as to cut different depths of flutes and by replacing the fluting cutters with others the shape of the flutes can be varied according to the type of tap it is desired to manufacture.

Figure 28:
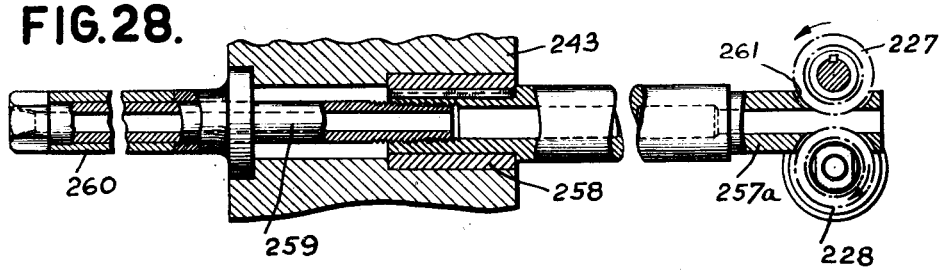
Figure 28 is a sectional view taken on the line 28—28 of Fig. 20 and shows the supporting spindle for the grooving cutter.

At work position 15c the tap blank enters a supporting tube similar in all respects to tube 257a previously described, see Fig. 28. Feed pipe 259 of work position 15b and a similar feed pipe at work position 15c are connected to a pump 289 (see Figure 6), which forces oil or cutting fluid to the fluting cutters. The pump 289 is driven by a belt 290 which passes around a pulley 291 secured to the end of drive shaft 20.

When the turret 16 moves to the left the entire stroke produced by drum cam 171, the turret comes to rest for a short time, then the fluting cutters 227, 228, 262 and 264 move away from their cutting position and leave the tap blanks free to revolve, as is necessary in milling the threaded portions, which will be later described.

*Structure and operation of thread cutting tools*

Referring to Figs. 1, 2, 3, 19, 20, 22, 24, 25, 26, 27 and 28:

In milling the thread portion of a tap which lies between the flutes it is usual to use a multiple cutter. When the cutting teeth of the multiple cutter are set in a spiral the cutter is generally classed as a "hob". In this case the hob has to be geared to revolve in a certain fixed ratio with the tap being milled, and also has to be set at a slight angle to the tap being milled.

The method of using a hob is not considered as the most desirable for manufacturing taps in a machine such as is being described, so the alternative method of milling with a multiple cutter having teeth not set in a spiral is shown.

If the thread portion of the tap is milled by a multiple milling cutter the cutting teeth are set circumferentially and the cutter is really a series of single cutters disposed alongside one another. In this case the cutter may revolve at any desired speed, while the tap blank is rotated slowly to provide a suitable rate of feed, no specific relation in speeds being required. In this way the threaded portion of the tap blank may be finished in one complete revolution of the tap blank.

When using a multiple cutter it is simply fed into the work the full depth of the thread and then either the cutter or the tap blank is moved in a lengthwise direction equal to the pitch of the thread. The axis of the multiple cutter is set parallel with the axis of the work.

As before stated in this description, this machine is so organized as to have the work divided into nearly even stages. In order to accomplish this, there are employed two sets of multiple cutters. One set consisting of the multiple cutters 292 and 294 located at work station 15d and the cutters 295 and 296 located at work station 15e.

The two cutters 292, 294 at work station 15d, mill oppositely disposed threaded portions 297, 298, as shown in Fig. 34b. Similarly the multiple cutters 295, 296 at work station 15e mill oppositely disposed threaded portions 299, 300 at positions having an angular relation of 180° to threaded portions 297, 298 as is shown in Fig. 34c. This method divides the work of cutting the threaded portion of the tap blank into two equal portions. While the turret head 16 is moving to the left, by reason of the shape of the cam groove in drum cam 171, the flutes are cut in the tap blank. At its extreme left hand position the turret head rests and the multiple cutters 292, 294, 295 and 296 move into cutting positions, and the tap blanks at work stations 15d and 15e slowly revolve to feed the portion of the tap blank to be cut against the multiple cutters. The cutters then move away from the work and the turret head starts to move to the right. The mechanism by which this is accomplished will now be described.

Referring to Fig. 21, the multiple cutter 292, which operates at work station 15d, is removably keyed to a taper spindle 301. At the rear end of taper spindle 301 is keyed a pinion gear 302. The taper spindle 301 is carried by a bushing 305 mounted in an arm 306 which is pivoted on shaft 307. The bushing 305 is adjustable in the arm 306 by means of the screw collet 308 which is clamped in adjusted position by the bolt 309.

The other multiple cutters 294, 295 and 296 are mounted in a similar manner. Each of the pinion gears at the rear of the mountings mesh with the gear 304 in the same way as 302. The gear 304 is keyed to shaft 307 which is revolvably mounted in a sleeve 310 which is carried by the tool head 243, see Fig. 21. Gear 258, which has been previously described, is keyed to the end of shaft 307, and is driven from constantly rotating shaft 20 by pinion 256 and idler 257, as before described. In this manner the multiple cutters 292, 294, 295 and 296 are all rotated at the same speed. The outer end of shaft 307 is supported by a bracket 311 which is fastened to the tool head 243, see Fig. 20.

Multiple cutter 295 is mounted in arm 312 which is pivoted on sleeve 314 which is loosely mounted on the portion of shaft 307 between bracket 311 and tool head 243. Multiple cutter 292 is mounted, as before described, in arm 306 which is pivoted on the hub 313 of arm 312. Integral with arm 306 is an extension 315 and a quadrant 316. Arm 312 has an extension 317 which coacts with adjusting screws 318 mounted in extension 315. By this means an adjustment can be made so as to position the multiple cutters 292 and 295 relative to each other. The quadrant 316 serves to move the multiple cutters 292 and 295 in unison when it is rotated by the pinion 319 which meshes with it.

Multiple cutters 294 and 296 are mounted in a similar manner. Multiple cutter 296 is mounted in an arm 320 which is pivoted on sleeve 314, see Fig. 21. Multiple cutter 294 is mounted in an arm 321 which is pivoted on hub 322 of arm 320. Integral with arm 321 is an extension 324 and a quadrant 325. Extension 324 coacts with adjusting screws 326 mounted in an extension 327 which is integral with arm 320 which carries multiple cutter 296. By this means an adjustment can be made so as to position the multiple cutters 294 and 296 relative to each other. The quadrant 325 serves to move the multiple cutters 294 and 296 in unison when it is rotated by pinion 328 which meshes with it. Pinion 319 meshes with pinion 328 in a manner now to be described.

Referring now to Fig. 30: Secured at the left side of the tool head 243 is a bushing 329 and at the right side a bushing 330. Rotatably mounted in these two bushings is a shaft 332 which extends outwardly to a bearing 394 in bracket 311, see Fig. 20. Keyed to this shaft 332 is the pinion 319. The pinion 319 is wide and one part of it meshes with the quadrant 316 and the other part with pinion 328 previously described. Pinion 328 is loosely mounted on a shaft 334 which carries a stud 335, said shaft is mounted in tool head 243 and a bearing 336 carried by bracket 311.

At the left hand end of shaft 332 is keyed a pinion 337 which meshes with a quadrant 338 pivotedly mounted on a sleeve 339 which is fixed in the tool head 243. An extension 340 coacts with adjusting screws 341, which are mounted on an extension 342 forming part of a quadrant 344 loosely mounted on sleeve 339. The shaft 345 on which is mounted idler gear 259 passes through a slot 343a in a quadrant 344 and is mounted in the tool head 243. Quadrant 344 meshes with a pinion gear 345, which is keyed to a sleeve 346 loosely mounted on drive shaft 113. At the left hand end of sleeve 346, see Fig. 24, is keyed a cam arm 347.

Referring now to Fig. 22, the cam arm 347 carries at its lower end a cam roller 348 which cooperates with a cam groove 349 cut in the face of cam disc 256, which is keyed to cycle shaft 35 and carries on its opposite face the cam groove 257 which operates the in and out movement of the fluting cutters.

From the foregoing description, it will be seen that the cam groove 349, acting through arm 347, quadrants 344, 339, pinion 337, pinions 328 and 319, and quadrants 325 and 316, control the in and out movement of the multiple cutters 295 and 292, and the multiple cutters 296 and 294.

The sleeve 346 passes through the tool head 243, having a shoulder 350 at the left hand face and a retaining ring 351 and collar 352 at the right hand face. A locking ring 354 is secured at the left hand end of sleeve 346. By means of this construction the pinions 345, 251 and 244, with the cam arms 254 and 347, are held in proper relation to the tool head 243, see Fig. 24.

As before stated, after the multiple cutters 292, 294, 295, 296 are fed in the full depth of the thread the tap blank is slowly rotated to obtain a suitable rate of feed, while the multiple cutters are rotated at any desired speed. During this milling operation it is necessary to feed the multiple cutters lengthwise of the tap blank in order to produce the desired pitch to the thread.

As shown in the drawings, the cutting action of the multiple cutters covers substantially one quarter of the circumference of the tap blank so that the endwise motion of any multiple cutter will be one quarter the pitch of the thread, as the tap blank has four flutes and four threaded portions when it is completed. The multiple cutters must be fed in to full depth of thread before they actually begin to cut the tap blank and must be entirely clear of the metal of the tap blank before they begin to move out.

The mechanism for accomplishing this result will now be described.

Referring to Fig. 21: The shaft 307 is mounted in a sleeve 310, the shaft 307 being held in proper relation by shoulder 355 and pinion gear 258. The gear 304 which rotates the multiple cutters abuts the shoulder 355. The arms 320, 321, 312, and 306 are loosely mounted on sleeve 314, which is mounted on the right hand end of shaft 307. These arms are held in position on the sleeve 314 by the flange 357. The sleeve 314 is held on the shaft 307 by retaining collar 358. The portion 359 of sleeve 314 forms an outboard bearing for shaft 307 and sleeve 314 in the bracket 311.

By reason of the structure just described, a lengthwise motion of the sleeve 310 through the head 243 will move the multiple cutters, with their in-and-out mechanism, and the mechanism for rotating the multiple cutters, lengthwise of the tap blanks which are being milled.

In the mechanism shown in the drawings, this distance is substantially one-fourth of the pitch of the thread which is being milled. The sleeve 310 is splined to the sleeve 339 by means of the spline 336. The sleeve 310, mounted in tool head 243 passes through a recess 361 formed in the tool head. Within the recess 361 the sleeve 310 has a thread 362 cut on it. Coacting with the thread 362 is a nut 364 working between slip rings 365, 366.

The nut 364 has an arm 367 made integral with it and which at its outer end thereof has a worm wheel quadrant 368 which is pivoted at 369. The worm wheel quadrant 368 coacts with a worm 370, which is mounted in the arm 367. Quadrant 368 has an arm 371 to which is pivoted a connecting rod 372, which has its lower end pivoted to an adjustable block 374 mounted on a cam arm 375. The cam arm 375 is pivoted to a bracket 376 fixed to the main frame 10 of the machine and carries a cam roller 377 which coacts with a cam groove 378 cut in the face of a cam 379. Cam 379 is keyed to the cycle shaft 35, see Fig. 19.

The connecting rod has the usual right and left hand threaded adjustment locked in position by the lock nuts 380, 380. By this means the position of the nut 364 in regard to the sleeve 310 can be brought to an approximate position so as to properly position the multiple cutters and then the fine adjustment can be made with the worm 370 and worm quadrant 368.

The adjustable block 374 is mounted in the bifurcated end 381 of lever 375 and is adjusted along the guides 382 by means of the screw 384. By this means of adjusting the length of the cam arm 375, the amount of motion imparted to the connecting rod 372, arm 367, and nut 364 can be varied and the exact relation of this motion to the pitch of the thread 362 can be fixed by the adjustable block 374 and the worm and worm wheel adjustment on the end of lever 367 which is integral with the nut 364.

As before described, the multiple cutters 292, 294, 295 and 296 are keyed to their respective taper spindles. As the machine is cutting the four threaded sections 297, 298, 299, 300, of the tap blank at the same time it is apparent that each of the four multiple cutters 292, 294, 295 and 296 must have their cutting action spaced apart one quarter of the pitch of the thread being milled on the tap blank. This may be accomplished by making the face 385 of the multiple cutters 292, etc., different for each cutter or by placing shims between the face 385 and the shoulder 386 of the taper spindles 301.

Figure 23:
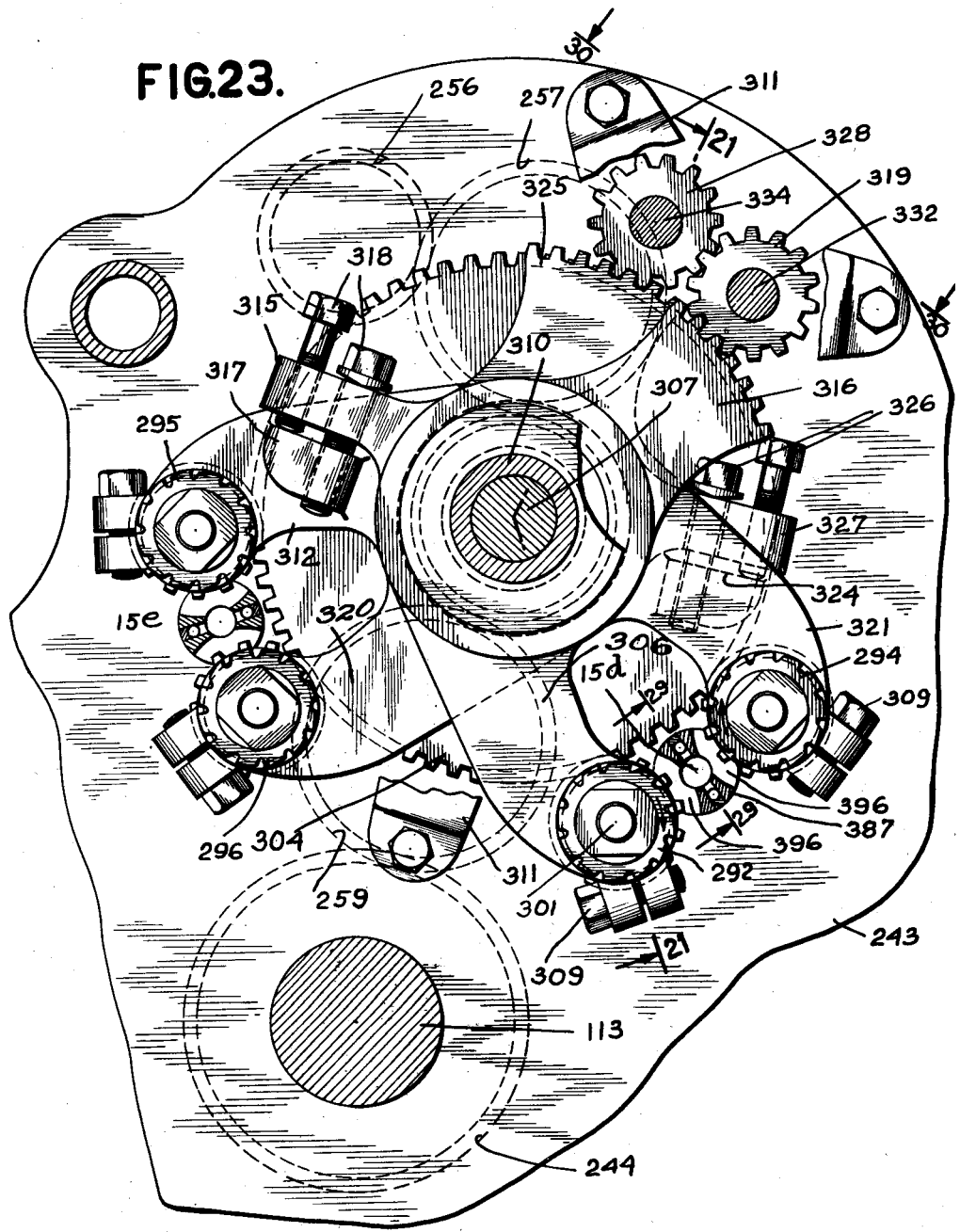
Figure 23 is a face view, at an enlarged scale, of the cutting tool carrying head looking in the same direction as Fig. 20 but with some of the cutters and their appurtenances removed.
Figure 29:
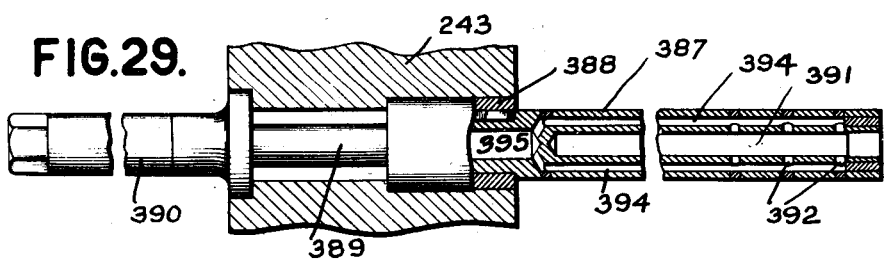
Figure 29 is a sectional view taken on the line 29—29 of Fig. 23 and shows the method of feeding oil to the thread milling cutters.
Figure 36:
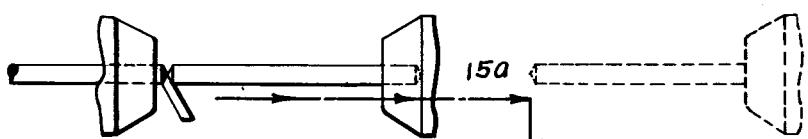
Figure 36 is a diagrammatic view showing the sequence of operations and the movement of the stock as it is presented to the grooving cutters in forming a twist drill.

When the turret head 16 carries the tap blanks forward to the work positions 15d and 15e for the purpose of milling the threaded portions, it is necessary that the blank be properly supported. Referring to Fig. 29: There is mounted in the tool head 243 at each of the work stations 15d and 15e a tubular structure 387. This is keyed in a bushing 388 which is supported in the tool head 243. Screwed into the other end of the bushing 388 is an oil feed pipe 389 which is similar to the oil feed pipe 259 at fluting work stations 15b and 15c. The oil feed pipe 389 is supported by a sleeve 390 secured to the tool head 243. As the tap blank approaches the multiple cutters, it enters a recess 391 found in the end of supporting member 387. This recess connects by small orifices 392 with two tubular passages 394, 394 which lead to the passage 395, which connects with the oil pipe 389. The tubular structure is cut away on opposite sides as at 396, see Fig. 23, so that the multiple cutters may mill the tap blank when it is held by the supporting member 387 and the cutters are milling full depth. By this means a supply of oil or cutting fluid may be fed to the point where the multiple cutters are milling the thread on the tap blank.

As previously described, as the turret head 16 moves to the left the flutes 223, 223 are cut on the tap blank which is at work station 15b, and at the same time the flutes 263, 263 are cut on the tap blank which is at work station 15c. During the time that this fluting operation is taking place the previously fluted tap blanks, which are at work stations 15d and 15e are being fed into the supporting tubular structure 387, but as the multiple cutters are separated there is no work done on the tap blanks.

As the fluting cuts are finished, and the turret head has moved to its extreme left hand position, the fluting cutters 227, 228 at work position 15b, and the fluting cutters 262, 264 at work position 15c move outwardly to a position where they clear the tap blanks which are at these work positions. At the same time the multiple cutters 292, 294 at work position 15d and multiple cutters 295, 296 at work position 15e move inwardly until they are in a position to mill the tap blank the full depth of the thread. At this time the cutting point of the multiple cutters lies in the flute and the teeth do not touch the metal on either side of the flute. In order to mill the thread it is necessary to slowly revolve the tap blank and the milling action continues until the multiple cutters have finished the cut or a distance of 54°. This same action occurs simultaneously with each of the multiple cutters 292, 294 at work station 15d, and with each of the multiple cutters 295, 296 at work station 15e. The slow revolution of the tap blanks at work stations 15d and 15e is accomplished with the following mechanism.

As previously described, the fluting cutters 227, 228 at work station 15b, and fluting cutters 262, 264 at work station 15c move outwardly at the time the multiple cutters at work stations 15d and 15e move inwardly to cutting position. For this reason the fluted tap blanks at work stations 15b and 15c are free to revolve in unison with the tap blanks at work stations 15d and 15e which are being milled. Also the tap blank at work station 15a is free to revolve without injury to the blank.

As previously stated, central driving gear 140 is in mesh with each of the five pinion gears 139 which form a part of each of the chuck mechanisms 16a, 16b, 16c, 16d and 16e. Referring to Fig. 3: The hub of the gear 140 extends to the left in the form of a sleeve 221 and terminates in a flange which has clutch teeth 222 cut in the side thereof. These clutch teeth 222 cooperate with corresponding clutch teeth 224 which are cut on a flange forming part of a sleeve 225 which is splined to the central shaft 113.

Mounted on a portion of the tool head 15 is a lever 226 which has its upper end in engagement with a groove in sleeve 225 and carries at its lower end a cam roller which coacts with a cam groove 228 formed in the right hand end of drum cam 124, which also carries the cam groove for operating the cutting off and grooving tools, as before described.

At the proper time, while the turret head 16 is at its left hand position this clutch 222, 224 is thrown in by cam groove on drum cam 124 and all the chucks with their tap blanks are slowly revolved counterclockwise 54°. At the end of the thread milling operation the cam breaks the clutch and the tap blanks stop revolving.

From the foregoing description, it will be seen that after a tap blank has been clamped in the chuck at work station 15a, two oppositely disposed flutes 223, 223 are cut at work station 15b, two oppositely disposed flutes 263, 263 are cut at work station 15c, half way between the first two flutes. Oppositely disposed threaded portions 297, 298 are milled at work station 15d, and oppositely disposed threaded portions 299, 300 are milled at work station 15e.

When the turret head 16 moves to the right the tap blank in the chuck jaws 129 at work position 15e has been rough finished and after being ejected from the machine is ready for hardening and grinding.

If it is desired to relieve the cutting edges of the threaded portions 297, 298, 299, 300, as is shown in Fig. 35, it is necessary to make the contour of the cam groove 349, see Fig. 22, of such a character that as the tap blanks are slowly revolved for the milling operation, the multiple cutters 292, 294, 295, 296 are fed in to a slightly greater depth of cut, while the milling operation is being performed.

*Ejector and chuck lock*

Referring to Figs. 1, 2, 3, 10, 12, 13 and 16: When the turret head 16 moves to the left the chuck opposite work station 15a is ready to receive a new tap blank. Assuming, for the purposes of description, that this is chuck 16a, chuck 16e will be opposite work station 15e having a tap blank held in the jaws 129, which has already had the flutes 223, 223 cut in it at work station 15b, flutes 263, 263 at work station 15c, and threaded portions 297, 298 at work station 15d. As before described, when the turret 16 reaches its extreme left hand position it rests while the multiple cutters mill the threaded portions 299 and 300 and the tap blank in chuck 16e is ready to be ejected.

As the turret head moves to the right the part of the yoke 150, which is opposite the hinge 151, comes in contact with the abutment 397 which is mounted on the rod 398. The rod 398 is supported on a bracket 399 and has its other end supported in the tool head 15. The rod 398 passes through an extension 400 of turret structure 16, see Fig. 10, and has mounted upon it a sleeve 401 also passing through the turret structure 16. This sleeve has clamped upon it two abutment collars 402 and 404. This sleeve 401 and collars 402 and 404 do not enter into the tap making operations, as shown in the drawings but have to do with a modified use of the machine as will be mentioned later.

When the yoke 150 comes in contact with abutment 397 it is forced to the left and, as previously described, this will force sleeve 147 to the left, which will free the three locking dogs 132, see Fig. 12.

This action releases the jaws 129 and the tap blank is then held loosely in the chuck 16e. The motion to the right of the turret structure 16 causes the ejector pin spindle 157 to be pressed by the stationary cam 143, as the jaws 129 are loosened, so that the ejector pin 160 will force the finished tap out of the jaws 129.

Referring to Fig. 1, at 405 is shown a tray. When the turret head structure 16 is at the right hand of its stroke and the tap blank is ready to be ejected, this tray 405 is moved by a cam action, not shown, in under the mouth of the jaws 129 of the chuck which is opposite work position 15e and the finished tap drops into it. As the turret head 16 moves to the left the tray 405 moves out of its path to the position shown in Fig. 1 and the operator removes the finished tap.

The turret head index mechanism now moves this chuck 16e to a position opposite work station 15a, and as it moves to the left the chuck receives a fresh tap blank from the feeding and cut off mechanism 17, as previously described.

As previously described, the yoke 150, of the chuck at work station 15e was unlocked and the tap blank ejected as the turret 165 finishes its index movement to bring the chuck 16e to a point opposite work station 15a. As the turret 165 comes to rest cutaway portion 406 of yoke 150, see Fig. 2, comes to rest at a point where it can cooperate with a projection 407 of a collar 408 mounted on sleeve 409. Sleeve 409 has at its right hand end a flange 410. A spring 411 is interposed between the flange 410 and collars 412 which are pinned to the rod 414 on which sleeve 409 and spring 411 are mounted. Rod 414 is slidably mounted in a bracket 415 fixed to the frame of the machine and has its other end mounted in turret structure 16.

Resting against flange 410 is one end of a cam lever 416, pivoted at 417 and having at its lower end a cam roller 418 which coacts with a drum cam 419, which is mounted on cycle shaft 35.

When the cutaway portion 406 of yoke 150 is in a position so that it can coact with extension 407 of collar 408, the turret 165 has stopped rotating. At this time cam 419 moves the sleeve 409 to the right and the projection 407 of collar 408 moves the yoke 150 to the right, or to locked position and the parts of the chuck 16e are in the position shown in Fig. 12, and the jaws 129 have a firm grip on the new tap blank and twists it off from the rod of stock. It is at this instant that the cut off tool 112 finishes its work and the turret moves to the right with its fresh tap blank. As the turret structure 16 moves to the right the rod 414 slides through its bearing in bracket 415, the flange 410 moves to the right and away from the cam arm 416. When the turret head 16 reaches its left hand position, as the rod 414 is fixed to the turret head 16 the collars 412 have forced the flange 410 into position against the cam arm 416 through the medium of the resilient spring 411.

In Figs. 31 and 31a the use of the sleeve 401 is shown. As the turret head 16 moves to the right and left the sides of the extension 400 come in contact with the collars 402, 404 and move the sleeve 401 a short distance to the right and left. This movement may be used to control a self opening die head of the non-revolving type when it is desired to chase the threads of a tap. The self opening die 422 is controlled by yoke 424 and after opening is pulled away from the tap by the spring 425.

Sequence of operations

Referring to Figs. 33, 33a, 34, 34a, 34b, 34c and 35: The sequence of the operations which have previously been described will now be explained with reference to the diagrams.

Referring to Fig. 33: The raw stock 72 is fed through the mouth 78 of the feeding mechanism located in tool head 15 at work station 15a. The grooving tool 114 cuts groove 111 in the fresh tap blank while tool 112 starts to cut off the previously grooved tap blank. When the blank is cut off it is seized by the jaws of the chuck 16a mounted in the turret structure 16. The turret now moves to the right until the tap blank is at the position shown in dotted lines at 420. The turret index mechanism now moves it to the position 421 opposite work station 15b, and during the movement the blank revolves 180°. The turret now feeds the blank between the fluting cutters 227, 228 which have moved into cutting position, and the flutes 223, 223 are cut, see Fig. 34. At the position marked 422 the cutting action has ceased and the cutters 227, 228 move outwardly and the turret moves to the right until the tap blank is again at position marked 421.

The index mechanism now moves the tap blank with its two flutes to a position opposite work station 15c as at 424, and the tap blank revolves 180°. The turret now feeds the blank to the fluting cutters 262, 264 which are so positioned on the tool head 15 that they cut flutes 263, 263 at a position 90° from flutes 223, 223 or directly half way between, as shown in Fig. 34a. The turret now moves to the right and the tap blank moves with it to a position marked 424.

The turret index mechanism now moves the tap blank to the position marked 425, Fig. 33a, opposite work position 15d, and revolves 180°. The turret now feeds the tap blank to the left until it is at the position 426 between the multiple cutters 292, 294. The cutters now feed in to cutting depth and the clutch 221—222 is thrown in and the blank slowly revolves and the threaded portions 297' 298 are milled. When the milling operation has been completed the multiple cutters 292, 294 move outwardly and the turret 16 moves to the right until the tap blank is again at position 425, see Fig. 33a. The turret index mechanism now moves the tap blank until it is at 426 opposite work position 15e. The tap blank is now moved to the left by the turret 16 until it is between the multiple cutters 296, 296 at the position marked 427. The multiple cutters 295, 296 are fed into cutting depth and the tap blank being slowly revolved the threaded portions 299, 300 are milled. The multiple cutters now move outwardly and the turret starts to move to the right. The tap blank which now has the four flutes cut in it and the four threaded portions having been milled is finished and ejected from the machine at the point marked 428.

*Twist drills*

Referring to Figures 36, 37, 37a, 37b, 37c and 38. It is obvious that the machine illustrated in these drawings can be easily adapted to manufacture twist drills.

In manufacturing twist drills the flutes are cut in successive operations, and it is necessary to rotate the blank as it is fed to the fluting cutters. This may be accomplished by making the cam 124 which controls the dental clutch 222, 224 of the proper contour so as to give the correct timing.

Figure 37:
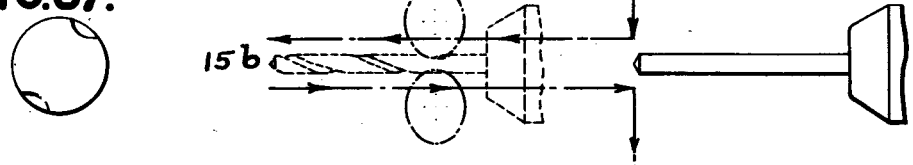
Figures 37, 37a, 37b, and 37c are diagrams showing the stock with the various progressive cuts.
Figure 37A:
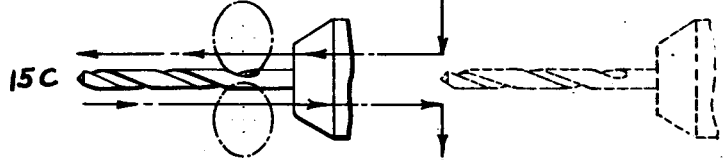
Figure 37B:
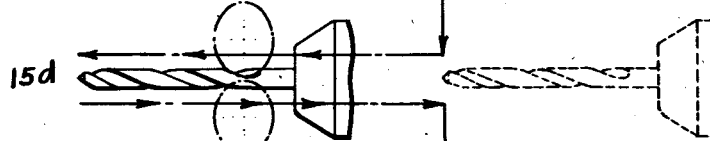
Figure 37C:
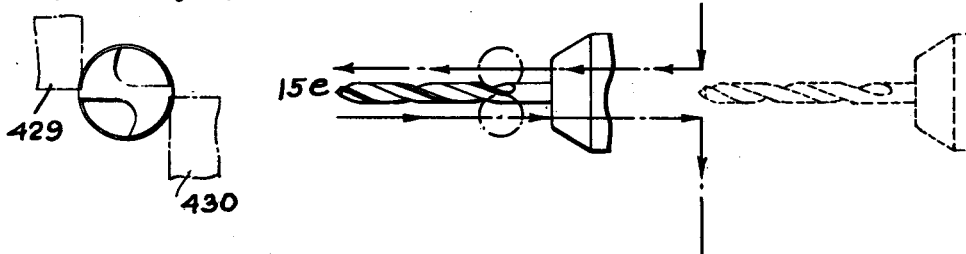
Figure 38:
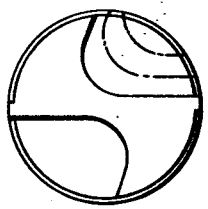
Figure 38 is a diagram showing the various cuts and how the drill is sized.

The blank is picked up at work station 15a. The two flutes are partially cut at work station 15b, as shown in Fig. 37. The second cut is made at work station 15c, as shown in Fig. 37a. The third cut is made at work station 15d as shown in Fig. 37b and at 15e the clearing cutters 429, 430, as shown in Fig. 37c, relieve the lip of the drill. Fig. 38 shows the end view of a drill with the successive cuts indicated in dotted lines.

*Reamers*

Referring to Figures 39, 40, 40a 40b, 40c. In manufacturing reamers on a machine such as is illustrated the blank is picked up at work station 15a, as is shown in Fig. 39. The blank then moves to work station 15b and two oppositely disposed flutes 431 are cut, as shown in Fig. 40. At work station 15c the adjacent oppositely disposed flutes 432 are cut as shown in Fig. 40a. At work station 15d the flutes 433 are cut as shown in Fig. 40b and at work station 15e the flutes 434 are cut as shown in Fig. 40c. The finished reamer is now ejected from the machine in the same way as the finished tap was removed. In order to manufacture reamers the blank is not revolved, as the reamer blank is fed to the cutters. The position of the blank with respect to the cutters would require a different cam to control the dental clutch 222, 224. The needed changes in speeds would be obvious to any person skilled in the art. The invention embodying the machine which has been described is not limited to the features as specifically shown but can be varied greatly without departing from the scope of the invention. The various adjustments for the cutting tools have not been elaborated upon but are of great importance in being able to meet the best conditions of practical operation.

In Fig. 32 a modified form of the dental clutch, which controls the duration of the time during which the tap blanks are revolved for the thread milling operation, is shown. The operation of the parts are as already described. The arm 226, is controlled by the groove in cam 124. In the modification shown the clutch teeth 222 are formed on a sleeve 221b, which is splined to a sleeve 221a, which extends to the right from the gear 140, which meshes with the chuck rotating gear 139. Due to the fact that the sleeves 221a and 221b are splined together it is possible to operate the dental clutch at any position of the turret 16. As the dental clutch is controlled by cam 124 on cycle shaft 35 it is possible by this construction to make or break the clutch 222, 224 at any point in the cycle or, in other words, to rotate the blanks at any point in the cycle and if necessary to do this a plurality of times per cycle.

An important feature is the means for controlling the cutters automatically. While this is shown and described as designed, it is manifest that by means of the same or similar devices the operation of the cutters may be varied at will. That is to say, the various cutters may be caused to separate or come together in many other ways and at such times as the requirements of special work may require.

To those skilled in the art of making machines, of the class described, many alterations in construction and widely different applications of this invention will suggest themselves, without departing from the spirit and scope as set forth in the claims. The drawings and descriptions herein are purely illustrative and are not intended to be limiting.

What is claimed is:—

1. In a machine of the character described, in combination, a turret head, a cycle shaft, a drum cam carried thereby and formed with a groove, means carried directly by the head and disposed within the groove whereby the head is reciprocated, work carriers rotatably mounted on the head, a rotating shaft, operative connections between the shaft and the work carriers comprising clutch means and means controlled by the cycle shaft to actuate the clutch.

2. In a machine of the character described, in combination, a tool holding part, a turret head, a cycle shaft, a cam carried thereby and having guide means, means on the head and engaging with said guide means whereby the head is reciprocated, a turret gear rotatable within the head, a rotating and axially movable shaft within the gear, work carriers rotatably mounted on the turret gear, means to rotate the work carriers from the axially movable shaft comprising extensible means and means to operatively connect the extensible means to the axially movable shaft controlled by the cycle shaft.

3. In a machine of the character described, in combination, a cam actuated reciprocating work holder, a plurality of work carriers thereon, means to rotate the work carriers, cutters of one type laterally movable in an arc into and out of engagement with the work, cutters of another type laterally movable into and out of engagement with the work, holding means to receive immovable cutters a cam shaft, means controlled by the cam shaft to selectively move the said movable cutters and a cam, the movement of which is controlled by the cam shaft to actuate the reciprocating work holder.

4. In a machine of the character described, the combination with a work holder and a tool holder, of means to cause said work and tool holders to approach one another, means to cause the tools to selectively engage and disengage the work and means to cause the work to selectively revolve, advance and remain stationary while being operated on at a predetermined time after the approach of the tool and work holders.

5. In a machine of the character described, the combination with a tool holder and a work holder, of thread cutters movable into and out of engagement with the work, a cycle shaft, means controlled by the cycle shaft to move the thread cutters, means to rotate the work during the thread cutting operation, means controlled by the cycle shaft to move the thread cutters axially of the work during the rotation of the work and dependent upon the speed of rotation of the work and means controlled by the cycle shaft to progressively move the thread cutters toward the axis of the work during the thread cutting operation.

6. In a machine of the character described, the combination with a tool holding part and a work holder, of thread cutters movable into and out of engagement with the work, a cycle shaft, means controlled by the cycle shaft to move the thread cutters, rotating means, driving connections between the work holder and the rotating means comprising clutch means controlled by the cycle shaft whereby the work holder may be rotated to rotate the work during the thread cutting operation, and means controlled by the cycle shaft to move the thread cutters axially of the work during the rotation thereof.

7. In a machine of the character described, in combination, a reciprocating work holding part, a work carrier carried thereby, means to rotate the work holding part through a predetermined angle at one extreme position of its movement, means to simultaneously rotate the work carrier through a predetermined angle and means to rotate the work carrier in the opposite direction through a different predetermined angle at the other extreme position of the work holding part.

8. In a machine of the character described, in combination, a reciprocating work holding part, a plurality of work carriers carried thereby, means to rotate the work holding part through a predetermined angle at one extreme position of its movement, means dependent upon rotation of the work holder to simultaneously rotate the work carriers through a predetermined angle and means to rotate the work carriers in the opposite direction through a predetermined angle at the other extreme position of the work holding part.

9. In a machine of the character described, in combination, a reciprocating work holding part, a plurality of work carriers carried thereby, a cycle shaft, a gear carried by the work holding part, a pinion meshing with the gear, a shaft upon which the pinion is carried, gearing to rotate the shaft, and means comprising a geneva wheel on the cycle shaft to give said gearing an intermittent rotation whereby said work holding part is intermittently rotated between a plurality of stations, means dependent upon rotation of the work holding part to simultaneously rotate the work carriers through a predetermined angle and means to rotate the work carriers in the opposite direction through a predetermined angle at the other extreme position of the work holding part.

10. In a machine of the character described, in combination, a reciprocating work holding part, a plurality of work carriers carried thereby, means to rotate the work holding part through a predetermined angle at one extreme position of its movement comprising a sun gear carried with the work holding part, planetary pinions carried with the work carriers, respectively, whereby rotation of the work holding part rotates the work carriers through a predetermined angle, a shaft rotating in a direction opposite to that of the work holding part, clutch means to operatively connect the sun gear to said shaft to rotate the planetary pinions in the opposite direction at any time in the reciprocation of the work holding part.

11. In a machine of the character described, in combination, a reciprocating work holding part, a plurality of work carriers carried thereby, means to rotate the work holding part through a predetermined angle at one extreme position of its movement comprising a sun gear carried with the work holding part, planetary pinions carried with the work carriers, respectively, whereby rotation of the work holding part rotates the work carriers through a predetermined angle, a shaft rotating in a direction opposite to that of the work holding part, clutch means to operatively connect the sun gear to said shaft to rotate the planetary pinions in the opposite direction, and cam means to control the clutch means whereby the planetary pinions are rotated in the opposite direction through a predetermined angle.

12. In a machine of the character described, the combination with a work holding part, a tool holding part and a plurality of tools pivotally mounted thereon, means to rotate the tools of a cycle shaft, means controlled by the cycle shaft to cause the work holding part to approach the tool holding part, means to bring the tools into and out of engagement with the work, means controlled by the cycle shaft to actuate the last named means and means controlled by the cycle shaft to move the tools axially of the work.

13. In a machine of the character described, the combination with a work holding part intermittently rotatable between a plurality of stations, and a tool holding part having movable tools mounted thereon, of a cycle shaft, means controlled by the cycle shaft to cause the work holding part to approach the tool holding part and separate therefrom, means controlled by the cycle shaft to cause certain of the tools to approach the axis of the work at certain stations prior to the approach of said parts, and to recede from the axis of the work upon completion of the approach movement and means controlled by the cycle shaft to cause certain of the tools to approach the work at other stations after the approach movement has been completed and to recede from the work prior to the commencement of the separation of the parts.

14. In a machine of the character described, the combination of a cycle shaft, a work holding part, a tool holding part, segment gears carried therewith, tool holders carried with the segment gears, respectively, cutters carried with the tool holders, gears engaged by the segment gears, respectively, sleeves on which the said gears are mounted, a cycle shaft, and means controlled by the cycle shaft to rotate the sleeves whereby the cutters are brought in an arc into and out of engagement with the work and means to move said cutters axially.

15. In a machine of the character described, in combination, a work holding part, a tool holding part, a plurality of groups of cutting tools carried thereby, a cycle shaft, means for rotating the cutting tools continuously, means for moving one group of cutting tools into cutting position and removing them from cutting position, means for moving a second group of tools into cutting position advancing them axially and removing them from cutting position, said last named means being controlled by the cycle shaft whereby the movement of the second group of cutting tools is in timed relation to the movement of the first group of cutting tools.

16. In a machine of the character described, the combination with a tool head and a work head, said tool head and work head having a plurality of corresponding indexing positions, respectively, a tool holder mounted on the tool head between two of the indexing positions, tools so mounted upon the tool holder as to operate on the work at said two positions simultaneously, means to move the tool holder whereby the tools are brought up to and away from the work at said two positions simultaneously and means to advance the tools axially of the work during the cutting operation.

17. In a machine of the character described, in combination, a cycle shaft, a tool holding part, a work holding part, rotary-work holders mounted thereon, means controlled by the cycle shaft to effect approach and separation of said parts, means controlled by the cycle shaft to rotate the work holders, automatic means to vary the speed of rotation of the cycle shaft whereby the speed of separation of the parts is different from the speed of approach of the parts and cam means to selectively accelerate and retard the speed of forward travel of the work holding part.

18. In a machine of the character described, in combination, a turret head, means mounting the turret head for reciprocation, a cam, means carried with the head and engaged by the cam whereby the turret head is reciprocated, a turret gear rotatable within the head, a rotating and axially movable shaft within the gear, means whereby the gear is rotated by the shaft, work carriers rotatably mounted on the turret, a gear on each work carrier in mesh with the turret gear and means to rotate the axially movable shaft.

19. In a machine of the character described, in combination, a turret, means mounting the turret for reciprocation, a cam, means carried with the turret and engaged by the cam whereby the turret is reciprocated, a shaft rotatable with respect to the turret and axially movable therewith, a gear rotatable on the turret, operative connections between the gear and the shaft, at least one work carrier rotatable on the turret, a gear on a work carrier rotated by the first named gear, rotating means, and driving connections between the rotating means and the rotatable and axially movable shaft operative at every position of reciprocation thereof.

20. In a machine of the class described, in combination, a turret head, means mounting the turret head for reciprocation, work carriers, gearing carried thereby, respectively, means mounting the work carriers on the turret, cam means, means carried directly by the turret and engaged by the cam means to reciprocate the turret, rotatable means movable with the turret, gearing fixed thereon and in mesh with the work carrier bearing, rotating means and means operatively connecting the rotating means and the movable rotatable means.

21. In a machine of the character described, in combination, a reciprocating work holding part, a plurality of work carriers carried thereby, a cycle shaft, a gear carried by the work holding part, a pinion meshing with the gear, a shaft upon which the pinion is carried, gearing to rotate the shaft, and intermittently operating means actuated by the cycle shaft to give said gearing an intermittent rotation whereby said work holding part is intermittently rotated between a plurality of stations, means dependent upon rotation of the work holding part to simultaneously rotate the work carriers through a predetermined angle and means to rotate the work carriers in the opposite direction through a predetermined angle at the other extreme position of the work holding part.

22. In a machine of the character described, in combination, a turret, means mounting the turret for reciprocation, a tool holder relatively fixed in position, at least one tool carrying head thereon, driving means, operable connections directly connecting the driving means and the tool carrying head and operable connections directly connecting the said driving means and the turret operative at every position of reciprocation thereof.

23. In a machine of the character described, in combination, a turret, means mounting the turret for reciprocation, a tool holder relatively fixed in position, at least one tool carrying head thereon, driving means, operable connections directly connecting the driving means and the tool carrying head and operable connections directly connecting and reciprocating with the said driving means and the turret operative at every position of reciprocation thereof.

24. In a machine of the character described, in combination, a turret, means mounting the turret for reciprocation, a tool holder relatively fixed in position, at least one tool carrying head thereon, power means disposed on the opposite side of the tool holder from the turret, driving means actuated by the power means, operable connections directly connecting the driving means and the tool carrying head, and operable connection directly connecting the said driving means and the turret operative at every position of reciprocation thereof.

25. In a machine of the character described, in combination, a work holding turret, means mounting the turret for reciprocation, a tool holder relatively fixed in position, at least one tool carrying head thereon, a drive shaft, gearing directly connecting the tool carrying head and the shaft and gearing directly connecting the said shaft and the turret at every position of reciprocation thereof.

26. In a machine of the character described, in combination, a turret, means mounting the turret for reciprocation, a cam, means carried by the turret and engaged by the cam whereby the turret is reciprocated, a tool holder relatively fixed in position, at least one tool carrying head thereon, a shaft rotatable with respect to the turret and axially movable therewith, means to rotate the shaft and the cam synchronously, a gear rotatable on the turret, gearing directly connecting the gear and the shaft, at least one work carrier rotatable on the turret, a gear on the work carrier rotated by the first named gear, means to move the tool carrying head, gearing directly connecting the last named means and said shaft, rotating means, and driving connections between the rotating means and the shaft operative at every position of reciprocation thereof.

27. In a machine of the character described, in combination, a reciprocable and rotatable work carrier, a plurality of work holders thereon, a fixed tool carrier, tools rotatably mounted thereon, and a bar stock feeding device on the opposite side of the tool carrier from the work carrier and passing through the tool carrier to deliver the work to a work holder and cutting means for said work disposed between the tool and work carriers.

28. In a machine of the character described, in combination, a reciprocable and rotatable work carrier, a plurality of work holders thereon, a fixed tool carrier, tools rotatably mounted thereon, and a stock feeding device on the opposite side of the tool carrier from the work carrier and passing through the tool carrier to deliver the work to a work holder.

29. In a machine of the character described, in combination, a reciprocable and rotatable work carrier, a plurality of work holders thereon, a fixed tool carrier, tools rotatably mounted thereon and a stock feeding device having its stock delivery means between the tool carrier and work carrier to deliver work to the work holder.

ABRAM D. WILT, Jr.